(12) United States Patent
Qiao

(10) Patent No.: US 10,198,506 B2
(45) Date of Patent: *Feb. 5, 2019

(54) SYSTEM AND METHOD OF SENTIMENT DATA GENERATION

(75) Inventor: Hong Liang Qiao, Epping (AU)

(73) Assignee: Lexxe Pty Ltd., North Strathfield NSW (AU)

(*) Notice: Subject to any disclaimer, the term of this patent is extended or adjusted under 35 U.S.C. 154(b) by 941 days.

This patent is subject to a terminal disclaimer.

(21) Appl. No.: 13/452,718

(22) Filed: Apr. 20, 2012

(65) Prior Publication Data

US 2013/0018894 A1 Jan. 17, 2013

Related U.S. Application Data

(60) Provisional application No. 61/506,584, filed on Jul. 11, 2011.

(51) Int. Cl.
G06F 17/30 (2006.01)
G06F 17/27 (2006.01)
G06F 17/22 (2006.01)

(52) U.S. Cl.
CPC .... G06F 17/30719 (2013.01); G06F 17/2229 (2013.01); G06F 17/271 (2013.01);
(Continued)

(58) Field of Classification Search
USPC .......................................................... 707/739
See application file for complete search history.

(56) References Cited

U.S. PATENT DOCUMENTS 5,095,432 A * 3/1992 Reed ..................... G06F 17/271
704/9
5,151,857 A 9/1992 Matsui
(Continued)

FOREIGN PATENT DOCUMENTS

EP 2045728 4/2009
EP 2048585 4/2009
(Continued)

OTHER PUBLICATIONS

Demartini, Gianluca, "ARES: A Retrieval Engine Based on Sentiments," Proceedings of the 33rd European Conference on Advances in Information Retrieval, Apr. 18, 2011.
(Continued)

*Primary Examiner* — Srirama Channavajjala

(57) ABSTRACT

A method, computer-readable medium, and a computer system for automatically generating sentiment data are disclosed. One or more portions of at least one document may be determined to be associated with at least one sentiment of one or more other portions of the at least one document. One or more scores associated with the at least one sentiment may be automatically determined based on at least one respective attribute of the one or more portions. The at least one respective attribute may include a positive category, a negative category, a neutral category, a degree associated with a positive sentiment, a degree associated with a negative sentiment, some combination thereof, etc. In this manner, data associated with sentiment of one or more portions of at least one document may be generated.

12 Claims, 27 Drawing Sheets

(52) U.S. Cl.
CPC ...... *G06F 17/2785* (2013.01); *G06F 17/3061* (2013.01); *G06F 17/30637* (2013.01); *G06F 17/30654* (2013.01); *G06F 17/30663* (2013.01); *G06F 17/30684* (2013.01); *G06F 17/30705* (2013.01); *G06F 17/30864* (2013.01)

(56) References Cited

U.S. PATENT DOCUMENTS

| | | | |
|---|---|---|---|
| 6,076,051 A * | 6/2000 | Messerly | G06F 17/30684 704/10 |
| 6,263,336 B1 * | 7/2001 | Tanaka | G06F 17/2211 |
| 6,697,798 B2 * | 2/2004 | Nakamura | G06F 17/30716 |
| 7,213,205 B1 | 5/2007 | Miwa et al. | |
| 8,015,183 B2 | 9/2011 | Frank | |
| 8,554,701 B1 * | 10/2013 | Dillard et al. | 706/12 |
| 2002/0178152 A1 | 11/2002 | Azzam | |
| 2003/0115187 A1 | 6/2003 | Bode et al. | |
| 2003/0130993 A1 | 7/2003 | Mendelevitch et al. | |
| 2004/0054661 A1 | 3/2004 | Cheung et al. | |
| 2004/0059718 A1 * | 3/2004 | Zhou | G06F 17/3069 |
| 2005/0108212 A1 | 5/2005 | Karimisetty et al. | |
| 2005/0154690 A1 | 7/2005 | Nitta et al. | |
| 2005/0154701 A1 * | 7/2005 | Parunak | G06F 17/30705 |
| 2005/0197829 A1 * | 9/2005 | Okumura | G06F 17/2735 704/10 |
| 2005/0267871 A1 | 12/2005 | Marchisio et al. | |
| 2006/0010111 A1 | 1/2006 | Jones et al. | |
| 2006/0031216 A1 | 2/2006 | Semple et al. | |
| 2006/0041549 A1 | 2/2006 | Gundersen et al. | |
| 2006/0173821 A1 | 8/2006 | Hennum et al. | |
| 2006/0224580 A1 * | 10/2006 | Quiroga | G06F 17/30654 |
| 2006/0235689 A1 | 10/2006 | Sugihara et al. | |
| 2007/0106657 A1 | 5/2007 | Brzeski et al. | |
| 2007/0203885 A1 * | 8/2007 | Kim | G06F 17/30707 |
| 2008/0114750 A1 | 5/2008 | Saxena et al. | |
| 2008/0120279 A1 | 5/2008 | Xue | |
| 2008/0172377 A1 | 7/2008 | Kapadia et al. | |
| 2009/0043749 A1 | 2/2009 | Garg et al. | |
| 2009/0055390 A1 | 2/2009 | Maeda et al. | |
| 2009/0089047 A1 | 4/2009 | Pell et al. | |
| 2009/0125371 A1 * | 5/2009 | Neylon et al. | 705/10 |
| 2009/0182737 A1 | 7/2009 | Melman | |
| 2009/0248511 A1 | 10/2009 | Mehta et al. | |
| 2009/0300046 A1 * | 12/2009 | Abouyounes | G06F 17/30265 |
| 2010/0114855 A1 * | 5/2010 | Li | G06F 17/30707 707/708 |
| 2010/0161313 A1 * | 6/2010 | Karttunen | G06F 17/2775 704/9 |
| 2010/0262454 A1 * | 10/2010 | Sommer et al. | 705/10 |
| 2011/0161071 A1 * | 6/2011 | Duong-van | 704/9 |
| 2011/0246179 A1 * | 10/2011 | O'Neil | 704/9 |
| 2013/0018874 A1 * | 1/2013 | Qiao | G06F 17/30864 707/723 |

FOREIGN PATENT DOCUMENTS

| | | |
|---|---|---|
| EP | 2 169 562 A1 * | 3/2010 |
| KR | 1020000050225 | 8/2000 |
| KR | 1020070052028 | 5/2007 |
| KR | 1020080017686 | 2/2008 |

OTHER PUBLICATIONS

Hu et al., "Mining and Summarizing Customer Reviews," Proceedings of the Tenth ACM SIGKDD International Conference on Knowledge Discovery and Data Mining, 2004.

Liu et al., "Opinion Observer: Analyzing and Comparing Opinions on the Web," Proceedings of the 14th International Conference on World Wide Web, pp. 342-351, 2005.

Liu et al., "Opinion Searching in Multi-Product Reviews," Proceedings of the Sixth IEEE International Conference Computer on and Information Technology, 2006.

Magnini et al., "A WordNet-Based Approach to Named Entities Recognition," in proceedings of the SemaNet'02 workshop entitled "Building and Using Semantic Networks," 2002.

Popescu et al., "Extracting Product Features and Opinions from Reviews," Proceedings of the Conference on Human Language Technology and Empirical Methods in Natural Language Processing, 2005.

Qiao, Hong Liang, "Lexxe Search Engine," from http://www.hcsnet.edu.au, Sep. 2006.

* cited by examiner

100

```
                    ┌─────────┐
                    │  START  │
                    └────┬────┘
                         ▼
┌───────────────────────────────────────────────────────────────────┐
│  Determine A First Portion Of At Least One Document That Is      │
│  Associated With A First Sentiment Of A Second Portion Of The    │
│  At Least One Document                                            │
│                              105                                  │
└───────────────────────────────┬───────────────────────────────────┘
                                ▼
┌───────────────────────────────────────────────────────────────────┐
│  Automatically Determine, Based On At Least One Attribute Of The │
│  First Portion, A First Score Associated With The First Sentiment│
│  Of The Second Portion                                            │
│                              110                                  │
└───────────────────────────────┬───────────────────────────────────┘
                                ▼
┌───────────────────────────────────────────────────────────────────┐
│  Determine A Third Portion Of The At Least One Document That Is │
│  Associated With A Second Sentiment Of A Fourth Portion Of The   │
│  At Least One Document                                            │
│                              115                                  │
└───────────────────────────────┬───────────────────────────────────┘
                                ▼
┌───────────────────────────────────────────────────────────────────┐
│  Automatically Determine, Based On At Least One Attribute Of The │
│  Third Portion, A Second Score Associated With The Second        │
│  Sentiment Of The Fourth Portion                                  │
│                              120                                  │
└───────────────────────────────┬───────────────────────────────────┘
                                ▼
                             ( A )
```

| Affected Portion | Document ID | Sentence ID | Affected Portion ID | Effecting Portion | Effecting Portion ID | Score Data |
|---|---|---|---|---|---|---|
| weather | 1 | 1 | 2 | very good | 4, 5 | positive; degree = 2; +2 |
| weather | 438 | 25 | 10 | bad | 12, 13 | negative; degree = 1; -1 |
| weather | 2965 | 9 | 7 | so-so | 10, 11, 12 | neutral; degree = 0; 0 |
| weather | 3724 | 13 | 18 | - | - | - |
| sun | 1 | 2 | 2 | shining | 4 | positive; degree = 1; +1 |

| Document ID | Positive | Negative | Neutral | Net |
|---|---|---|---|---|
| 1 | 49 | 10 | 41 | +39 |
| 2 | 6 | 70 | 24 | -64 |
| 3 | 32 | 12 | 56 | +20 |
| 4 | 39 | 48 | 13 | -9 |

| Affected Portion | Document ID | Sentence ID | Affected Portion ID | Effecting Portion | Effecting Portion ID | Score Data |
|---|---|---|---|---|---|---|
| John | 1 | 20 | 1 | good | 5 | positive; degree = 1; +1 |
| Smith | 1 | 20 | 2 | good | 5 | positive; degree = 1; +1 |

| Affected Portion | Document ID | Sentence ID | Affected Portion ID | Effecting Portion | Effecting Portion ID | Score Data |
|---|---|---|---|---|---|---|
| John | 1 | 20 | 1 | good | 5 | positive; degree = 1; +1 |
| Smith | 1 | 20 | 2 | - | - | - |

| Affected Portion | Document ID | Sentence ID | Affected Portion ID | Effecting Portion | Effecting Portion ID | Score Data |
|---|---|---|---|---|---|---|
| John | 1 | 20 | 1 | - | - | - |
| Smith | 1 | 20 | 2 | good | 5 | positive; degree = 1; +1 |

| Affected Portion | Document ID | Sentence ID | Affected Portion ID | Effecting Portion | Effecting Portion ID | Score Data |
|---|---|---|---|---|---|---|
| National | 13 | 1 | 1 | - | - | - |
| Day | 13 | 1 | 2 | - | - | - |
| Celebration | 13 | 1 | 3 | - | - | - |
| Committee | 13 | 1 | 4 | Celebration | 3 | positive; degree = 1; +1 |

| Affected Portion | Document ID | Sentence ID | Affected Portion ID | Effecting Portion | Effecting Portion ID | Score Data |
|---|---|---|---|---|---|---|
| National | 13 | 1 | 1 | - | - | - |
| Day | 13 | 1 | 2 | - | - | - |
| Celebration | 13 | 1 | 3 | - | - | - |
| Committee | 13 | 1 | 4 | - | - | - |

| Affected Portion | Document ID | Sentence ID | Affected Portion ID | Effecting Portion | Effecting Portion ID | Score Data |
|---|---|---|---|---|---|---|
| John | 11 | 1 | 4 | nice | 2 | positive; degree = 1; +1 |
| Smith | 11 | 1 | 5 | help | 7 | positive; degree = 1; +1 |

| Affected Portion | Document ID | Sentence ID | Affected Portion ID | Effecting Portion | Effecting Portion ID | Score Data |
|---|---|---|---|---|---|---|
| John | 11 | 1 | 4 | nice | 2 | positive; degree = 1; +1 |
| Smith | 11 | 1 | 5 | help | 7 | positive; degree = 1; +1 |
| John Smith | 11 | - | - | - | - | positive; degree = 2; +2 |

| Document ID | Theme Or Semantic Key | Theme Elements Or Semantic Sub-Keys | Score Data | Combined Score Data |
|---|---|---|---|---|
| 1 | Fruit | apple | positive; degree = 2; +2 | +2; -1; +1 |
| | | cherry | negative; degree = 1; -1 | |
| | | pineapple | neutral; degree = 0; 0 | |
| 2 | Fruit | apple | negative; degree = 2; -2 | 2; -2; 0 |
| | | cherry | positive; degree = 1; +1 | |
| | | pineapple | positive; degree = 1; +1 | |
| 3 | Fruit | plum | neutral; degree = 0; 0 | +1; -3; -2 |
| | | apricot | positive; degree = 1; +1 | |
| | | orange | negative; degree = 3; -3 | |

| Affected Portion | Document ID | Sentence ID | Affected Portion ID | Effecting Portion | Effecting Portion ID | Score Data | Classification Data |
|---|---|---|---|---|---|---|---|
| Tom | 14 | 1 | 1 | hit | 2 | -1 | Negative Action Taker; Hurt |
| Chuck | 14 | 1 | 3 | hit | 2 | -1 | Negative Action Receiver; Hurt |
| beaches | 16 | 1 | 6 | very beautiful | 4, 5 | +2 | Positive Description; Good Appearance |

1010 spans {Affected Portion, Document ID, Sentence ID, Affected Portion ID}; 1020 spans {Effecting Portion, Effecting Portion ID}; 1030 is Score Data; 1040 is Classification Data.

SYSTEM AND METHOD OF SENTIMENT DATA GENERATION

RELATED APPLICATIONS

The present application claims the benefit of U.S. Provisional Patent Application No. 61/506,584, filed Jul. 11, 2011, entitled "SENTIMENT INDEXING," naming Hong Liang Qiao as the inventor. That application is incorporated herein by reference in its entirety and for all purposes.

The present application is related to U.S. patent application Ser. No. 13/452,713, filed Apr. 20, 2012, entitled "SYSTEM AND METHOD OF SENTIMENT DATA USE," naming Hong Liang Qiao as the inventor. That application is incorporated herein by reference in its entirety and for all purposes.

BACKGROUND OF THE INVENTION

Conventional search engines commonly use keywords from a user-input search query to locate and display webpages. For example, if a user were interested in learning about which countries border the United States, the user may enter a search query of "country bordering United States." In response, a conventional search engine would typically return webpages with all or some of the four words "country," "bordering," "United," and "States."

Although conventional search engines may be used to locate webpages that contain certain words, it is difficult or impossible to determine sentiment using conventional search engines. For example, if a user wants to learn about people's opinions of the performance of the Toyota Land Cruiser, a search query may be input that includes the words "Toyota Land Cruiser" and "performance." However, such a query would typically cause a conventional search engine to return many irrelevant webpages which contain information other than the sentiment of the performance of the Toyota Land Cruiser. As such, a user must wade through a large number of search results to find the desired sentiment if at all. Thus, determining sentiment using a conventional search engine is difficult and inefficient.

SUMMARY OF THE INVENTION

Accordingly, a need exists to more readily determine sentiment associated with one or more portions of at least one document. A need also exists to more efficiently determine sentiment associated with one or more portions of at least one document. Embodiments of the present invention provide novel solutions to these needs and others as described below.

Embodiments of the present invention are directed to a method, computer-readable medium, and a computer system for automatically generating sentiment data. More specifically, one or more portions of at least one document (e.g., including one or more words, at least one phrase, etc.) may be determined to be associated with at least one sentiment of one or more other portions of the at least one document. One or more scores associated with the at least one sentiment may be automatically determined based on at least one respective attribute of the one or more portions. The at least one respective attribute may include a positive category, a negative category, a neutral category, a degree associated with a positive sentiment, a degree associated with a negative sentiment, some combination thereof, etc. In this manner, data associated with sentiment of one or more portions of at least one document may be generated.

In one embodiment, data associated with at least one sentiment of at least one document may be stored for subsequent use. For example, the data may be stored in a database or index, where the data may be processed and/or used to perform at least one operation associated with search results (e.g., including one or more documents). The data may include at least one score, at least one classification, at least one degree, or some combination thereof. The at least one operation may include filtering the search results, ranking the search results, displaying an image associated with the at least one sentiment (e.g., a background or other feature of a webpage which indicates a sentiment associated with a plurality of search results, a background or other feature of a particular search result which indicates a sentiment associated with the particular search result or some portion thereof, an image displayed separate from the search results which indicates a sentiment associated with one or more of the search results or some portion thereof, etc.), some combination thereof, etc.

In one embodiment, a method of automatically generating sentiment data includes determining a first portion of at least one document that is associated with a first sentiment of a second portion of said at least one document. A first score associated with said first sentiment of said second portion is automatically determined based on at least one attribute of said first portion. The method also includes determining a third portion of said at least one document that is associated with a second sentiment of a fourth portion of said at least one document. A second score associated with said second sentiment of said fourth portion is automatically determined based on at least one attribute of said third portion.

In another embodiment, a computer-readable medium may have computer-readable program code embodied therein for causing a computer system to perform a method of automatically generating sentiment data. And in yet another embodiment, a system may include a processor and a memory, wherein the memory includes instructions that when executed by the processor implement a method of automatically generating sentiment data.

BRIEF DESCRIPTION OF THE DRAWINGS

The present invention is illustrated by way of example, and not by way of limitation, in the figures of the accompanying drawings and in which like reference numerals refer to similar elements.

FIG. 1A shows a first flowchart of a computer-implemented process for analyzing sentiment in accordance with one embodiment of the present invention.

FIG. 4 shows an exemplary data structure including sentiment data in accordance with one embodiment of the present invention.

FIG. 5 shows an exemplary data structure including sentiment data for at least one document in accordance with one embodiment of the present invention.

FIG. 6A shows a first exemplary data structure illustrating a score reduction resulting from affected portions being associated with the same name, phrase or other grammatical unit and also being associated with the same effecting portion in accordance with one embodiment of the present invention.

FIG. 6B shows a second exemplary data structure illustrating a score reduction resulting from affected portions being associated with the same name, phrase or other grammatical unit and also being associated with the same effecting portion in accordance with one embodiment of the present invention.

FIG. 6C shows a third exemplary data structure illustrating a score reduction resulting from affected portions being associated with the same name, phrase or other grammatical unit and also being associated with the same effecting portion in accordance with one embodiment of the present invention.

FIG. 7A shows a first exemplary data structure illustrating a score reduction resulting from an affected portion and a corresponding effecting portion being associated with the same name, phrase or other grammatical unit in accordance with one embodiment of the present invention.

FIG. 7B shows a second exemplary data structure illustrating a score reduction resulting from an affected portion and a corresponding effecting portion being associated with the same name, phrase or other grammatical unit in accordance with one embodiment of the present invention.

FIG. 8A shows a first exemplary data structure illustrating a score combination or increase resulting from affected portions being associated with the same name, phrase or other grammatical unit and also being associated with different effecting portions in accordance with one embodiment of the present invention.

FIG. 8B shows a second exemplary data structure illustrating a score combination or increase resulting from affected portions being associated with the same name, phrase or other grammatical unit and also being associated with different effecting portions in accordance with one embodiment of the present invention.

FIG. 9 shows an exemplary data structure including sentiment data for a theme and/or a semantic key in accordance with one embodiment of the present invention.

FIG. 10 shows an exemplary data structure including classification data associated with score data in accordance with one embodiment of the present invention.

DETAILED DESCRIPTION OF THE INVENTION

Figure 1B:
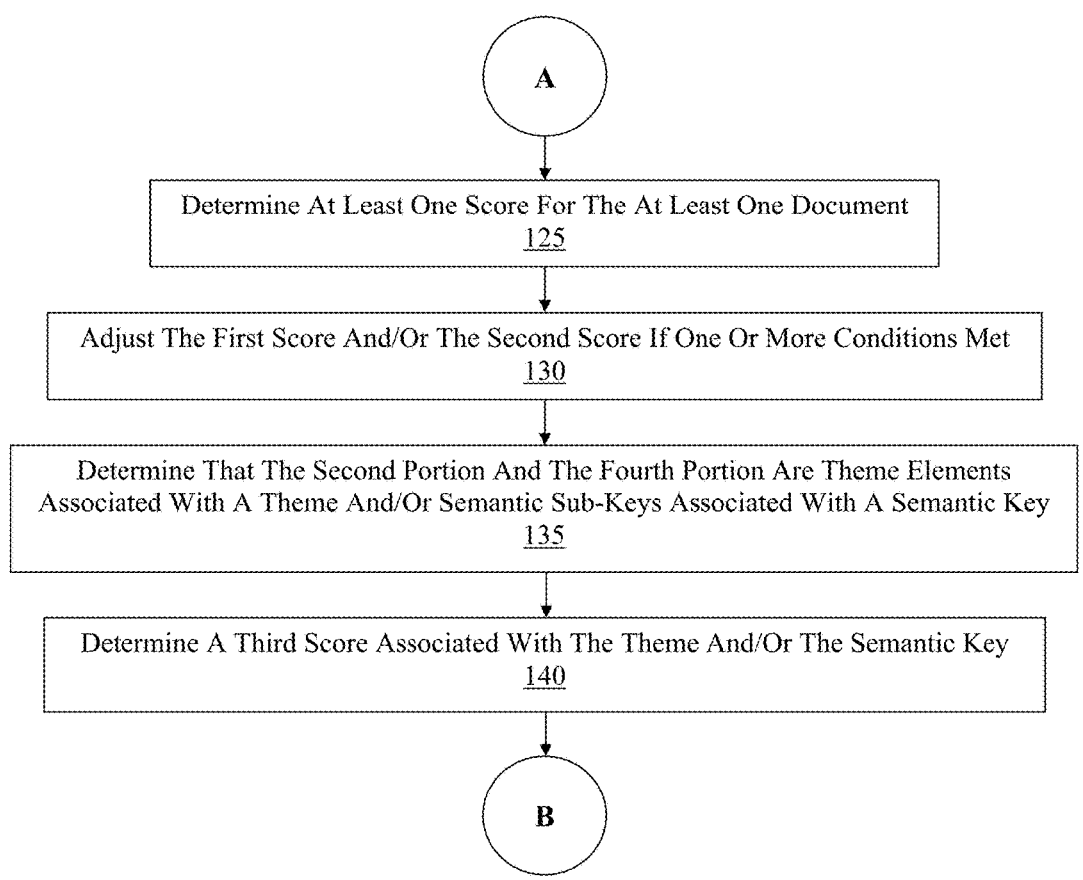
FIG. 1B shows a second flowchart of a computer-implemented process for analyzing sentiment in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "presenting," "processing," "programming," "querying," "ranking," "reducing," "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

Figure 1C:
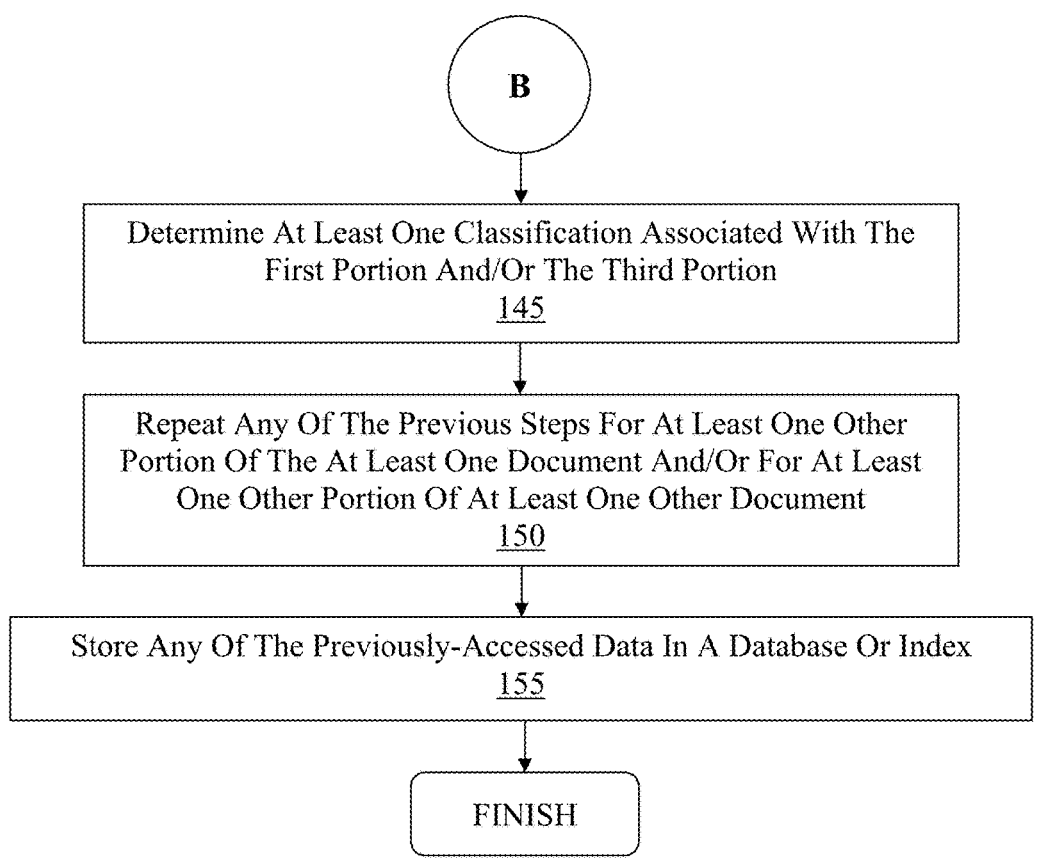
FIG. 1C shows a third flowchart of a computer-implemented process for analyzing sentiment in accordance with one embodiment of the present invention.
Figure 2:
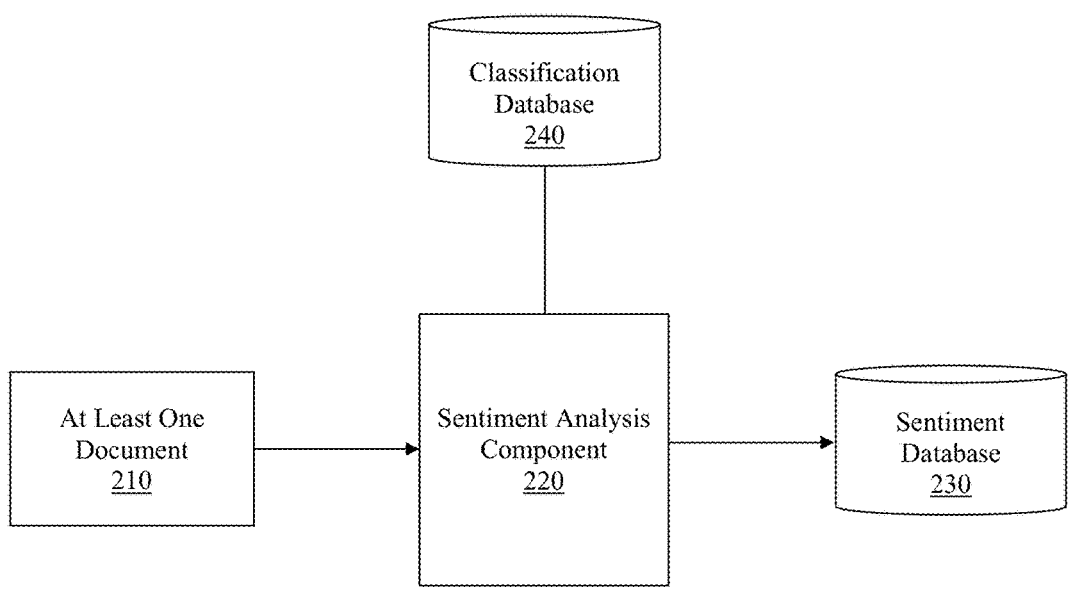
FIG. 2 shows an exemplary system for analyzing sentiment in accordance with one embodiment of the present invention.
Figure 3:
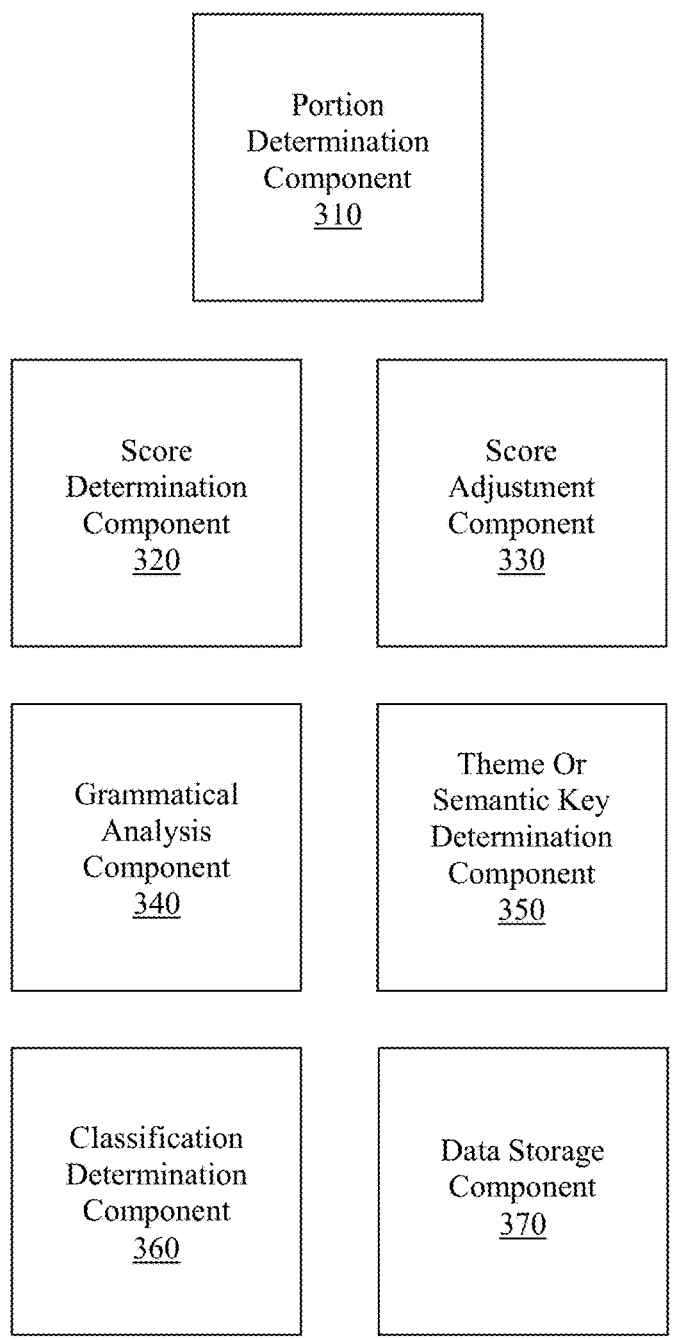
FIG. 3 shows components of an exemplary sentiment analysis component in accordance with one embodiment of the present invention.

In one embodiment, data associated with sentiment of one or more portions of at least one document may be generated (e.g., in accordance with process 100 of FIGS. 1A, 1B and 1C, using one or more components of system 200 of FIG. 2, using one or more components of processing component 220 of FIG. 3, etc.). The data may include at least one score (e.g., as shown in FIGS. 4, 5, 6A, 6B, 6C, 7A, 7B, 8A, 8B, 9, 10, etc.), at least one category (e.g., as shown in FIG. 4, 5, 6A, 6B, 6C, 7A, 7B, 8A, 8B, 9, 10, etc.), at least one degree (e.g., as shown in FIG. 4, 5, 6A, 6B, 6C, 7A, 7B, 8A, 8B, 9, 10, etc.), at least one classification (e.g., as shown in FIG. 10), or some combination thereof. The data may be modified or changed (e.g., a score may be reduced if portions of a document being scored are part of the same phrase or name as depicted in FIGS. 6A, 6B and 6C; a score may be reduced if one portion of a phrase or name causes another portion of the phrase or name to be scored as depicted in FIGS. 7A and 7B; sentiment data may be added for a name or phrase by combining or using information associated with portions of the name or phrase as depicted in FIGS. 8A and 8B; sentiment data may be added for a theme or semantic key by combining or using information associated with theme elements or semantic sub-keys as depicted in FIG. 9; sentiment data may be added for a theme or semantic key by combining or using information associated with theme elements or semantic sub-keys as depicted in FIG. 9; etc.) in one embodiment. And in one embodiment, the data may be stored (e.g., in a database or index for subsequent use).

Data associated with sentiment of one or more portions of at least one document may be accessed (e.g., in accordance with process 1100 of FIG. 11, using one or more components of system 1300A of FIG. 13A, etc.) and/or used (e.g., in accordance with process 1200 of FIG. 12, using one or more components of system 1300B of FIG. 13B, etc.) in one embodiment. For example, data associated with sentiment of one or more portions of at least one document may be accessed from a database using data associated with a search (e.g., a query used for the search to generate search results, information associated with the search results, at least a portion of the search results, at least one command, etc.). The data associated with the search may be input (e.g., by a user) using a user interface (e.g., graphical user interface 1400A of FIG. 14A, graphical user interface 1400B of FIG. 14B, graphical user interface 1500 of FIG. 15, etc.) in one embodiment. The data may be used to generate other data for performing at least one operation associated with search results (e.g., generated as a result of the search). The at least one operation may include filtering the search results, ranking the search results, displaying an image associated with the at least one sentiment (e.g., a background or other feature of a webpage which indicates a sentiment associated with a plurality of search results, a background or other feature of a particular search result which indicates a sentiment associated with the particular search result or some portion thereof, an image displayed separate from the search results which indicates a sentiment associated with one or more of the search results or some portion thereof, etc.), some combination thereof, etc. The image may be displayed using and/or as part of a graphical user interface (e.g., 1600A of FIG. 16A, 1600B of FIG. 16B, 1600C of FIG. 16C, etc.) in one embodiment.

Generation of Sentiment Data

FIGS. 1A, 1B and 1C show a flowchart of computer-implemented process 100 for automatically generating sentiment data in accordance with one embodiment of the present invention. FIG. 2 shows exemplary system 200 for analyzing sentiment in accordance with one embodiment of the present invention. As shown in FIG. 2, sentiment analysis component 220 may analyze sentiment associated with at least one document 210 (or at least one portion thereof) to generate data associated with the sentiment of one or more portions of at least one document 210 (e.g., "sentiment data"), where the sentiment data may be stored in sentiment index or database 230 in one embodiment. Sentiment database 230 may include one or more data structures (e.g., 400, 500, 600A, 600B, 600C, 700A, 700B, 800A, 800B, 900, 1000, some combination thereof, etc.). FIG. 3 shows components of exemplary sentiment analysis component 220 in accordance with one embodiment of the present invention.

Turning to FIG. 1A, step 105 involves determining a first portion of at least one document that is associated with a first sentiment of a second portion of the at least one document. For example, where a document includes the sentence "the weather is very good," step 105 may involve determining that "very good" (e.g., the first portion) is associated with a sentiment of "weather" (e.g., the second portion).

In one embodiment, step 105 may involve determining that the first portion effects or modifies the second portion, or conversely, that the second portion is affected by the first portion. In one embodiment, step 105 may involve determining (e.g., using a grammatical analyzer) that the first and second portions are within the same sentence, within the same sentence fragment, within the same paragraph, within a predetermined proximity (e.g., defined in terms of a number of words, a number of sentences, a number of paragraphs, etc.) to one another in a document, etc. In one embodiment, step 105 may involve determining (e.g., using a grammatical analyzer) that the first and second portions are within different sentences, within different sentence fragments, within different paragraphs, outside of a predetermined proximity (e.g., defined in terms of a number of words, a number of sentences, a number of paragraphs, etc.) to one another in a document, etc. And in one embodiment, step 105 may involve determining (e.g., using a grammatical analyzer) that the first and second portions are grammatically related (e.g., subject and predicate, subject and verb, verb and object, noun and adjective, pronoun and adjective, noun and adverb, pronoun and adverb, etc.). It should be appreciated that the first portion and the second portion may be any part of speech (e.g., a noun, verb, pronoun, adjective, adverb, preposition, conjunction, interjection, etc.), where the first and second portions may be the same part of speech (e.g., both nouns, both verbs, etc.) or different parts of speech.

In one embodiment, the first portion and/or second portion may be included in a sentence or sentence fragment that does not form a question. For example, when parsing a document to locate or identify the first portion and/or second portion, sentences or sentence fragments forming questions may be skipped in one embodiment.

In one embodiment, the first portion and/or the second portion of the at least one document may include at least one respective word. The first and second portions may be in the same document, or alternatively, may be in different documents in one embodiment. The at least one document may include at least one webpage, at least one electronic document, at least one electronic file, advertising content, some combination thereof, etc.

As shown in FIG. 1A, step 110 involves automatically determining, based on at least one attribute of the first portion, a first score associated with the first sentiment of the second portion. In one embodiment, the at least one attribute of the first portion may be a category (e.g., positive, negative, neutral, etc.) associated with the first sentiment. For example, "very good" in the previous example may be determined to belong to or otherwise be associated with a positive category in step 110. As another example, "bad" or "very bad" may be determined to belong to or otherwise be associated with a negative category in step 110. And as yet another example, "so-so" or "average" may be determined to belong to or otherwise be associated with a neutral category in step 110. In this manner, the first score (e.g., associated with the first sentiment of the second portion) determined in step 110 may be positive, negative, or neutral based on at least one attribute of the first portion.

In one embodiment, the at least one attribute of the first portion may be a degree associated with the first sentiment. For example, "very good" in the previous example may be determined to be associated with a medium degree or a particular numerical degree (e.g., 2 out of 3, where 1 may be a low degree, 2 may be a medium degree and 3 may be a high degree) in step 110. As another example, "excellent" may be determined to be associated with a high degree or a particular numerical degree (e.g., 3 out of 3, where 1 may be a low degree, 2 may be a medium degree and 3 may be a high degree) in step 110. And as yet another example, "good" may be determined to be associated with a low degree or a particular numerical degree (e.g., 1 out of 3, where 1 may be a low degree, 2 may be a medium degree and 3 may be a high degree) in step 110.

Although degrees associated with positive sentiments have been discussed in the previous examples, it should be appreciated that degrees may also be associated with negative sentiments. Additionally, although specific degrees have been discussed (e.g., low, medium, high, certain numerical degrees, etc.), it should be appreciated that a different number of degrees (e.g., less than or more than 3, etc.) or different types of degrees may be used in other embodiments.

As shown in FIG. 1A, step 115 involves determining a third portion of the at least one document that is associated with a second sentiment of a fourth portion of the at least one document. For example, where a document includes the sentence "the water is bad," step 115 may involve determining that "bad" (e.g., the third portion) is associated with a sentiment of "water" (e.g., the fourth portion).

In one embodiment, step 115 may involve determining that the third portion effects or modifies the fourth portion, or conversely, that the fourth portion is affected by the third portion. In one embodiment, step 115 may involve determining (e.g., using a grammatical analyzer) that the third and fourth portions are within the same sentence, within the same sentence fragment, within the same paragraph, within a predetermined proximity (e.g., defined in terms of a number of words, a number of sentences, a number of paragraphs, etc.) to one another in a document, etc. In one embodiment, step 115 may involve determining (e.g., using a grammatical analyzer) that the third and fourth portions are within different sentences, within different sentence fragments, within different paragraphs, outside of a predetermined proximity (e.g., defined in terms of a number of words, a number of sentences, a number of paragraphs, etc.) to one another in a document, etc. And in one embodiment, step 115 may involve determining (e.g., using a grammatical analyzer) that the third and fourth portions are grammatically related (e.g., subject and predicate, subject and verb, verb and object, noun and adjective, pronoun and adjective, noun and adverb, pronoun and adverb, etc.). It should be appreciated that the third portion and the fourth portion may be any part of speech (e.g., a noun, verb, pronoun, adjective, adverb, preposition, conjunction, interjection, etc.), where the third and fourth portions may be the same part of speech (e.g., both nouns, both verbs, etc.) or different parts of speech.

In one embodiment, the third portion and/or fourth portion may be included in a sentence or sentence fragment that does not form a question. For example, when parsing a document to locate or identify the third portion and/or fourth portion, sentences or sentence fragments forming questions may be skipped in one embodiment.

In one embodiment, the third portion and/or the fourth portion of the at least one document may include at least one respective word. The third and fourth portions may be in the same document, or alternatively, may be in different documents in one embodiment. The at least one document may include at least one webpage, at least one electronic document, at least one electronic file, advertising content, some combination thereof, etc.

As shown in FIG. 1A, step 120 involves automatically determining, based on at least one attribute of the third portion, a second score associated with the second sentiment of the fourth portion. In one embodiment, the at least one attribute of the third portion may be a category (e.g., positive, negative, neutral, etc.) associated with the second sentiment. For example, "bad" in the previous example may be determined to belong to or otherwise be associated with a negative category in step 120. As another example, "good" or "very good" may be determined to belong to or otherwise be associated with a positive category in step 120. And as yet another example, "so-so" or "average" may be determined to belong to or otherwise be associated with a neutral category in step 120. In this manner, the second score (e.g., associated with the second sentiment of the fourth portion) determined in step 120 may be positive, negative, or neutral based on at least one attribute of the third portion.

In one embodiment, the at least one attribute of the third portion may be a degree associated with the second sentiment. For example, "bad" in the previous example may be determined to be associated with a low degree or a particular numerical degree (e.g., 1 out of 3, where 1 may be a low degree, 2 may be a medium degree and 3 may be a high degree) in step 120. As another example, "very bad" may be determined to be associated with a medium degree or a particular numerical degree (e.g., 2 out of 3, where 1 may be a low degree, 2 may be a medium degree and 3 may be a high degree) in step 120. And as yet another example, "extremely bad" may be determined to be associated with a high degree or a particular numerical degree (e.g., 3 out of 3, where 1 may be a low degree, 2 may be a medium degree and 3 may be a high degree) in step 120.

Although degrees associated with negative sentiments have been discussed in the previous examples, it should be appreciated that degrees may also be associated with positive sentiments. Additionally, although specific degrees have been discussed (e.g., low, medium, high, certain numerical degrees, etc.), it should be appreciated that a different number of degrees (e.g., less than or more than 3, etc.) or different types of degrees may be used in other embodiments.

In one embodiment, steps 105 and/or 115 of process 100 may be performed by portion determination component 310 of sentiment analysis component 220 (e.g., as shown in FIG. 3). And in one embodiment, steps 110 and/or 120 of process 100 may be performed by score determination component 320 of sentiment analysis component 220 (e.g., as shown in FIG. 3).

FIG. 4 shows exemplary data structure 400 including sentiment data (e.g., data associated with sentiment of one or more portions of at least one document) in accordance with one embodiment of the present invention. As shown in FIG. 4, each row of data structure 400 may include respective score data (e.g., in column 470) that is associated with a respective effecting portion (e.g., in column 450) and/or a respective affected portion (e.g., in column 410). In one embodiment, one or more of the effecting portions (e.g., in column 450) may be analogous to the first portion (e.g., determined in step 105 of process 100) and/or the third portion (e.g., determined in step 115 of process 100), whereas one or more of the affected portions (e.g., in column 410) may be analogous to the second portion and/or the fourth portion. In this manner, each of the effecting portions (e.g., in column 450) may be associated with a respective sentiment (e.g., associated with the score data in column 470) of a respective affected portion (e.g., in column 410).

As shown in FIG. 4, one or more columns of data structure 400 (e.g., columns 420, 430 and 440) may provide a respective location of each affected portion in column 410. For example, column 420 may include a respective document identifier associated with each affected portion in column 410, column 430 may include a respective sentence identifier (e.g., a sentence number or numbers, etc.) associated with each affected portion in column 410, and column 440 may include a respective affected portion identifier (e.g., a word number or numbers, etc.) associated with each affected portion in column 410. As a further example, the first row in data structure 400 may correspond to the first sentence in Document "1" which reads: "[t]he weather is very good." In this case, the word "weather" may be an affected portion (e.g., modified or affected by the effecting portion "very good") located in the second word of the first sentence of Document "1."

One or more columns of data structure 400 (e.g., columns 420, 430 and 460) may provide a respective location of each effecting portion in column 450. For example, column 420 may include a respective document identifier associated with each effecting portion in column 450, column 430 may include a respective sentence identifier (e.g., a sentence number or numbers, etc.) associated with each effecting portion in column 450, and column 460 may include a respective effecting portion identifier (e.g., a word number or numbers, etc.) associated with each effecting portion in column 450. Using the above example where the first sentence in Document "1" reads "[t]he weather is very good," the words "very good" may be an effecting portion (e.g., associated with a sentiment of the affected word "weather") located in the fourth and fifth words of the first sentence of Document "1."

As shown in FIG. 4, each portion of score data in column 470 may include at least one respective score (e.g., determined in accordance with step 110 and/or step 120 of process 100). Each score may be determined by at least one respective attribute (e.g., a category, a degree, etc.) of a respective effecting portion (e.g., in column 450). For example, the score of "+2" in the first row may be determined based on a positive category and a degree of 2 associated with the effecting portion of "very good." As another example, the score of "−1" in the second row may be determined based on a negative category and a degree of 1 associated with the effecting portion of "bad." As yet another example, the score of "0" in the third row may be determined based on a neutral category and/or a degree of 0 associated with the effecting portion of "so-so."

Accordingly, data structure 400 may be used to access or determine data associated with sentiment of one or more portions of at least one document (e.g., by indexing a database or index including data structure 400). For example, where one or more affected portions within data structure 400 are associated with "Toyota Land Cruiser," the sentiment of the Toyota Land Cruiser may be easily and efficiently determined by indexing data structure 400 (e.g., using the affected portion "Toyota Land Cruiser") to access sentiment data associated with the Toyota Land Cruiser (e.g., indicating opinions or feelings about the Toyota Land Cruiser which may be positive, negative, neutral, positive of a certain degree, negative of a certain degree, etc.). The sentiment data may be determined from a plurality of documents or sources in one embodiment, thereby increasing the reliability and/or accuracy of the data accessed. Additionally, in one embodiment, the sentiment data may be further processed (e.g., to determine sentiment associated with a larger portion of a document, to determine sentiment associated with an entire document, to determine sentiment associated with a plurality of documents, etc.) to provide further information and/or analysis as discussed herein.

Turning to FIG. 1B, step 125 involves determining a respective score for each document of the at least one document. Step 125 may be performed by score determination component 320 of sentiment analysis component 220 (e.g., as shown in FIG. 3) in one embodiment.

In one embodiment, step 125 may involve determining at least one respective score (e.g., a respective positive score, a respective negative score, a respective neutral score, some combination thereof, etc.) for each document of the at least one document. A positive score may be determined for a document by adding or combining each of the positive scores for a plurality of affected portions of the document (e.g., a document with two affected portions each with a respective score of "+2" may result in a combined positive score for the document of "4"), based on the number of affected portions of the document associated with a positive score (e.g., a document with 10 affected portions associated with positive scores may result in a combined positive score for the document of "10"), etc. A negative score may be determined for a document by adding or combining each of the negative scores for a plurality of affected portions of the document (e.g., a document with two affected portions each with a respective score of "−1" may result in a combined negative score for the document of "2"), based on the number of affected portions of the document associated with a negative score (e.g., a document with 15 affected portions associated with negative scores may result in a combined negative score for the document of "15"), etc. A neutral score may be determined by combining the positive and negative scores (e.g., a document with two affected portions with scores of "+2" and "−2" may result in a combined neutral score of "0"), based on the number of affected portions of the document associated with a neutral score (e.g., a document with 5 affected portions associated with neutral scores may result in a combined neutral score for the document of "5"), etc.

FIG. 5 shows exemplary data structure 500 including sentiment data for at least one document in accordance with one embodiment of the present invention. As shown in FIG. 5, each row of data structure 500 may include at least one respective score (e.g., a positive score in column 520, a negative score in column 530, a neutral score in column 540, a net score in column 550, some combination thereof, etc.) for a respective document (e.g., in column 510). In one embodiment, one or more of the scores in columns 520, 530 and/or 540 may be determined based on a number of affected portions of a document that are associated with each category (e.g., positive, negative, neutral, etc.), a percentage of the affected portions of a document that are associated with each category (e.g., positive, negative, neutral, etc.), etc. For example, in one embodiment, the numbers in columns 520, 530 and 540 for any given row may add to 100 indicating that 100 percent of the affected portions of the document are accounted for in the data of these columns (e.g., 520, 530 and 540). In one embodiment, one or more of the scores in column 520 may be determined by adding or combining respective positive scores of respective affected portions of each document. One or more of the scores in column 530 may be determined by adding or combining respective negative scores of respective affected portions of each document in one embodiment. And in one embodiment, one or more of the scores in column 550 may be determined by adding or combining a respective positive score (e.g., in column 520) with a respective negative score (e.g., in column 530) for each document.

Accordingly, data structure 500 may be used to access or determine data associated with sentiment of at least one document (e.g., by indexing a database or index including data structure 500). The sentiment data (e.g., positive sentiment data in column 520, negative sentiment data in column 530, neutral sentiment data in column 540, etc.) may be used, for example, in combination with a search (e.g., to generate search results including one or more documents listed in column 510 of data structure 500) to determine the sentiment of something (e.g., identified in the query for the search) across the one or more documents of the search results. Additionally, the net sentiment data (e.g., in column 550) may allow a determination of whether the overall sentiment for each document is positive or negative and/or how positive or negative the sentiment is. In this manner, a larger amount of data may be advantageously represented in a more concise and/or comprehensible manner (e.g., when presenting the data using a webpage, graphical user interface, etc.) as discussed herein.

Turning back to FIG. 1B, step 125 may involve determining at least one score (e.g., a positive score, a negative score, a neutral score, some combination thereof, etc.) for a plurality of documents in one embodiment. The at least one score may be determined by combining, adding, etc. the data of data structure 400 and/or data structure 500. In this manner, sentiment data for a plurality of documents (e.g., included within or otherwise associated with search results) may be easily and/or efficiently determined (e.g., which may be used to indicate sentiment of search results or a portion thereof, etc.).

Step 130 involves adjusting the first score (e.g., determined in step 110) and/or the second score (e.g., determined in step 120) if one or more conditions are met. Step 130 may be performed by score adjustment component 330 (either alone or in combination with grammatical analysis component 340) of sentiment analysis component 220 (e.g., as shown in FIG. 3) in one embodiment. In one embodiment, grammatical analysis component 340 may be used to determine if a plurality of portions of at least one document are associated with the same name, phrase or other grammatical unit.

In one embodiment, step 130 may involve reducing one or more of a plurality of scores associated with a plurality of affected portions if the plurality of affected portions is associated with the same name, phrase or other grammatical unit and also is associated with a plurality of effecting portions that are the same (e.g., causing the plurality of scores to result from the same effecting portion). For example, FIGS. 6A, 6B and 6C show exemplary data structures (e.g., 600A, 600B and 600C, respectively) illustrating a score reduction resulting from affected portions being associated with the same name, phrase or other grammatical unit and also being associated with the same effecting portion in accordance with one embodiment of the present invention.

As shown in FIG. 6A, data structure 600A may include sentiment data associated with the affected portions "John" and "Smith" which may be part of the name or phrase "John Smith." Both "John" and "Smith" are associated with a score of "+1" based on at least one attribute of the same effecting portion "good." Accordingly, since both "John" and "Smith" (e.g., the plurality of affected portions) are associated with the same name or phrase and also are associated with the same effecting portion "good," the score associated with either affected portion (e.g., "John" or "Smith") may be reduced. For example, FIG. 6B shows a reduction of the score associated with the affected portion "Smith," while FIG. 6C shows a reduction of the score associated with the affected portion "John." In this manner, the overall score for the name or phrase "John Smith" will be only "+1" (based on the effecting portion "good") instead of the artificially high score of "+2" that would otherwise result from combining the respective "+1" scores if one of the scores had not been reduced.

Although FIGS. 6A, 6B and 6C only depict a name or phrase with two words, it should be appreciated that a name, phrase or other grammatical unit may include more than two words in other embodiments. In this case, more than one score may be reduced in step 130 if the affected portions are associated with the same effecting portion (e.g., causing the scores to result from the same effecting portion).

In one embodiment, step 130 may involve reducing at least one score associated with at least one affected portion if the at least one affected portion and a corresponding at least one effecting portion are associated with the same name, phrase or other grammatical unit. For example, FIGS. 7A and 7B show exemplary data structures (e.g., 700A and 700B, respectively) illustrating a score reduction resulting from an affected portion and a corresponding effecting portion being associated with the same name, phrase or other grammatical unit in accordance with one embodiment of the present invention.

As shown in FIG. 7A, data structure 700A may include sentiment data associated with the affected portions "National," "Day," "Celebration" and "Committee" which may be part of the name or phrase "National Day Celebration Committee." Accordingly, since both "Committee" (e.g., the affected portion) and "Celebration" (e.g., the corresponding effecting portion) are associated with the same name or phrase, the score associated with the affected portion "Committee" may be reduced as illustrated in FIG. 7B.

Although FIGS. 7A and 7B only depict the reduction of one score, it should be appreciated that any number of scores may be reduced in other embodiments. For example, where a plurality of affected portions and at least one corresponding effecting portion are associated with the same name, phrase or other grammatical unit, then a plurality of scores (e.g., associated with the plurality of affected portions) may be reduced in step 130.

In one embodiment, step 130 may involve increasing or combining scores associated with a plurality of affected portions if the plurality of affected portions is associated with the same name, phrase or other grammatical unit and also is associated with a plurality of effecting portions that are the different (e.g., causing the plurality of scores to result from different effecting portions). For example, FIGS. 8A and 8B show exemplary data structures (e.g., 800A and 800B, respectively) illustrating a score combination or increase resulting from affected portions being associated with the same name, phrase or other grammatical unit and also being associated with different effecting portions in accordance with one embodiment of the present invention.

As shown in FIG. 8A, data structure 800A may include sentiment data associated with the affected portions "John" and "Smith" which may be part of the name or phrase "John Smith." Both "John" and "Smith" are associated with a score of "+1" based on at least one respective attribute of the effecting portions "nice" and "help." Accordingly, since both "John" and "Smith" (e.g., the plurality of affected portions) are associated with the same name or phrase and also are associated with the different effecting portions "nice" and "help," the scores associated with the affected portions (e.g., "John" and "Smith") may be combined or increased. For example, FIG. 8B shows the respective scores of "+1" for "John" and "Smith" have been combined or increased to form the score of "+2" associated with the name or phrase "John Smith."

Although FIG. 8B shows the addition of data to data structure (e.g., the last row associated with the name or phrase "John Smith"), it should be appreciated that scores may be combined or increased in other manners in other embodiments. For example, the score associated with either "John" or "Smith" may be increased from "+1" to "+2" in one embodiment.

Turning back to FIG. 1B, step 135 involves determining that the second portion and the fourth portion are theme elements associated with a theme and/or are semantic sub-keys associated with a semantic key. In one embodiment, a theme associated with the second and fourth portions (e.g., as theme elements) may be determined in step 135 in accordance with U.S. patent application Ser. No. 12/884, 395, filed Sep. 17, 2010, and entitled "METHOD AND SYSTEM FOR SCORING TEXTS." In one embodiment, a semantic key associated with the second and fourth portions (e.g., as semantic sub-keys) may be determined in step 135 in accordance with U.S. patent application Ser. No. 12/112, 774, filed Apr. 30, 2008, entitled "SYSTEM AND METHOD FOR ENHANCING SEARCH RELEVANCY USING SEMANTIC KEYS" and/or in accordance with U.S. patent application Ser. No. 13/012,690, filed Jan. 24, 2011, entitled "IMPROVED SEARCHING USING SEMANTIC KEYS."

As an example, where the second portion includes the word "apple" and the fourth portion includes the word "cherry," step 135 may involve determining that the second portion (e.g., the word "apple") and the fourth portion (e.g., the word "cherry") are theme elements associated with the theme "fruit." As another example, where the second portion includes the word "apple" and the fourth portion includes the word "cherry," step 135 may involve determining that the second portion (e.g., the word "apple") and the fourth portion (e.g., the word "cherry") are semantic sub-keys associated with the semantic key "fruit."

In one embodiment, the theme or the semantic key that are determined in step 135 may not be an affected portion of the at least one document including the second portion and/or the fourth portion. And in one embodiment, the theme or the semantic key that are determined in step 135 may not be included in any portion of the at least one document including the second portion and/or the fourth portion.

FIG. 9 shows exemplary data structure 900 including sentiment data for a theme and/or a semantic key in accordance with one embodiment of the present invention. As shown in FIG. 9, data structure 900 may include respective score data (e.g., in column 940) for each theme element and/or semantic sub-key (e.g., in column 930). The theme elements and/or semantic sub-keys in column 930 may be one or more affected portions (e.g., described with respect to other Figures) of at least one document (e.g., in column 910) in one embodiment.

Column 920 may include at least one theme and/or at least one semantic key associated with the theme elements and/or semantic sub-keys in column 930 (e.g., as determined in step 135). For example, the theme or semantic key "fruit" in document "1" (depicted in FIG. 9 in the first row of data structure 900) may be determined in step 135 based on one or more of the associated portions (e.g., affected portions, theme elements, semantic sub-keys, some combination thereof, etc.) in column 930 (e.g., "apple," "cherry," "pineapple," some combination thereof, etc.). In one embodiment, the information in column 920 may be added to data structure 900 after the information in column 930 (e.g., responsive to performing step 135).

As shown in FIG. 1B, step 140 involves determining a third score associated with the theme and/or the semantic key. In one embodiment, the third score may be determined in step 140 based on the sentiment data of the corresponding theme elements and/or semantic sub-keys (e.g., in column 930 of data structure 900). In one embodiment, the third score determined in step 140 may include at least a portion of the combined score data (e.g., a combined positive sentiment score, a combined negative sentiment score, a net sentiment score, some combination thereof, etc.) in column 950 of data structure 900 of FIG. 9.

As shown in FIG. 9, data structure may include respective combined score data in column 950 for each of the documents in column 910 and/or each of the themes or semantic keys in column 920. For example, the combined score data associated with document "2" may include a combined positive sentiment score (e.g., "+2" determined in step 140 by adding or averaging the positive scores of "+1" and "+1" from the corresponding score data in column 940), a combined negative sentiment score (e.g., "−2" determined in step 140 by adding or averaging the negative scores of "−2" from the corresponding score data in column 940), a net sentiment score (e.g., determined in step 140 by averaging or adding the combined positive sentiment score and the combined negative sentiment score), some combination thereof, etc. In other embodiments, different or other sentiment data (e.g., other score data, other combined score data, classification data, etc.) may be included in column 950 or another column of data structure 900.

In one embodiment, step 135 of process 100 may be performed by theme or semantic key determination component 350 of sentiment analysis component 220 (e.g., as shown in FIG. 3). And in one embodiment, step 140 of process 100 may be performed by score determination component 320 of sentiment analysis component 220 (e.g., as shown in FIG. 3).

As shown in FIG. 1C, step 145 involves determining at least one classification associated with the first portion (e.g., determined in step 105) and/or the third portion (e.g., determined in step 115). The at least one classification may explain why a sentiment of a portion was determined (e.g., in step 110, in step 120, etc.) to be in a certain category (e.g., positive, negative, neutral, etc.), to have a certain degree (e.g., 1, 2, 3, 4, low, medium, high, etc.), etc. In one embodiment, the at least one classification may be an action taker (e.g., a positive action taker such as a benefactor, a negative action taker such as an offender, etc.), an action receiver (e.g., a positive action receiver such as a beneficiary, a negative action receiver such as a victim, etc.), a description (e.g., a positive description, a negative description, etc.), an identity (e.g., a positive identity such as Superman or The Red Cross, a negative identity such as Hitler or Nazi, etc.), etc. And in one embodiment, step 145 may be performed by classification determination component 360 of sentiment analysis component 220 (e.g., as shown in FIG. 3).

FIG. 10 shows exemplary data structure 1000 including classification data associated with score data in accordance with one embodiment of the present invention. As shown in FIG. 10, each row of data structure 1000 may include respective score data (e.g., in column 1030) that is associated with a respective effecting portion (e.g., in column 1020) and/or a respective affected portion (e.g., in column 1010). Additionally, data structure 1000 may also include respective classification data (e.g., in column 1040) associated with each score data (e.g., in column 1030) and/or each affected portion (e.g., in column 1010).

Taking the first and second rows of data structure 1000 (e.g., associated with the sentence "Tom hit Chuck") as an example, the effecting portion "hit" (e.g., in column 1020) may be associated with a sentiment of at least one affected portion (e.g., "Tom" in column 1010, "Chuck" in column 1010, etc.). A sentiment score of "−1" (e.g., as shown in column 1030) may be determined (e.g., in step 110, step 120, etc.) based on at least on attribute of the effecting portion (e.g., the word "hit" which may be associated with a negative sentiment or category, the lack of a modifier for the word "hit" may be associated with a degree of "1," etc.). Additionally, a respective classification (e.g., "Negative Action Taker; Hurt" as shown in column 1040, "Negative Action Receiver; Hurt" as shown in column 1040, etc.) associated with each affected portion (e.g., "Tom" in column 1010, "Chuck" in column 1010, etc.) and/or each effecting portion (e.g., "hit" as shown in column 1020) may be determined in step 145. In this manner, the classification data (e.g., in column 1040) may explain or otherwise be associated with why score data (e.g., a category, a degree, a score, other sentiment data, etc.) was determined for an affected portion (e.g., in column 1010) and/or an effecting portion (e.g., in column 1020). The classification data may also explain why a sentiment (e.g., associated with the score data in column 1030) of at least one affected portion (e.g., "Tom" in column 1010, "Chuck" in column 1010, etc.) was determined (e.g., in step 110, in step 120, etc.) to be in a certain category (e.g., positive, negative, neutral, etc.), to have a certain degree (e.g., 1, 2, 3, 4, low, medium, high, etc.), etc.

Taking the third row of data structure 1000 (e.g., associated with the sentence "Gold Coast has beautiful beaches") as another example, the effecting portion "very beautiful" (e.g., in column 1020) may be associated with a sentiment of the affected portion "beaches" (e.g., in column 1010). A sentiment score of "+2" (e.g., as shown in column 1030) may be determined (e.g., in step 110, step 120, etc.) based on at least on attribute of the effecting portion (e.g., the word "beautiful" which may be associated with a positive sentiment or category, the word "very" modifying "beautiful" may be associated with a degree of "2," etc.). Additionally, a classification (e.g., "Positive Description; Good Appearance" as shown in column 1040) associated with the affected portion (e.g., "beaches" in column 1010) and/or the effecting portion (e.g., "very beautiful" as shown in column 1020) may be determined in step 145. In this manner, the classification data (e.g., in column 1040) may explain or otherwise be associated with why score data (e.g., a category, a degree, a score, other sentiment data, etc.) was determined for an affected portion (e.g., in column 1010) and/or an effecting portion (e.g., in column 1020). The classification data may also explain why a sentiment (e.g., associated with the score data in column 1030) of an affected portion (e.g., "beaches" in column 1010) was determined (e.g., in step 110, in step 120, etc.) to be in a certain category (e.g., positive, negative, neutral, etc.), to have a certain degree (e.g., 1, 2, 3, 4, low, medium, high, etc.), etc.

In one embodiment, the at least one classification (or classification data associated therewith) may be determined in step 145 by indexing a database (e.g., classification database 240) using an effecting portion (e.g., in column 1020) to obtain classification data (e.g., in column 1040). The indexing may be performed by classification determination component 360 of sentiment analysis component 220 in one embodiment. In this manner, the database (e.g., classification database 240) may include an index of portions (e.g., effecting portions such as "hit," "beaches," etc.) and classification data (e.g., "Negative Action Taker; Hurt," "Negative Action Receiver; Hurt," "Positive Description; Good Appearance," etc.) in one embodiment.

As shown in FIG. 1C, step 150 involves repeating any of the previous steps (e.g., of process 100) for at least one other portion of the at least one document and/or for at least one other portion of at least one other document. Step 150 may be performed by one or more components of sentiment analysis component 220 (e.g., as shown in FIG. 3). In this manner, score data (e.g., including at least one category, at least one degree, at least one score, etc.), classification data associated therewith, data associated with at least one theme and/or at least one theme element, data associated with at least one semantic key and/or at least one semantic sub-key, other sentiment data, etc. may be determined and/or adjusted in step 150 for at least one other portion of the at least one document and/or for at least one other portion of at least one other document.

Step 155 involves storing any of the previously-accessed data (e.g., in any of the previous steps of process 100) in a database or index. For example, step 155 may involve storing any of the previously-accessed data in sentiment database 230 (e.g., as shown in FIG. 2) in one embodiment.

In one embodiment, step 155 may be performed by data storage component 370 of sentiment analysis component 220 (e.g., as shown in FIG. 3).

In one embodiment, data stored in step 155 may be subsequently accessed and used. For example, the data stored in step 155 may be accessed and used to perform a search for at least one document, to process search results of a search for at least one document, etc. As another example, the data stored in step 155 may be accessed and used to perform at least one operation associated with search results. In one embodiment, the at least one operation may include filtering the search results, ranking the search results, displaying an image associated with the at least one sentiment (e.g., a background or other feature of a webpage which indicates a sentiment associated with a plurality of search results, a background or other feature of a particular search result which indicates a sentiment associated with the particular search result or some portion thereof, an image displayed separate from the search results which indicates a sentiment associated with one or more of the search results or some portion thereof, etc.), some combination thereof, etc.

Although FIG. 2 shows a specific number and arrangement of components, it should be appreciated that FIG. 2 may include a different number and/or arrangement of components in other embodiments. Although FIG. 3 shows a specific number and arrangement of components, it should be appreciated that FIG. 3 may include a different number and/or arrangement of components in other embodiments.

Although FIGS. 4 through 10 depict data structures (e.g., 400, 500, 600A, 600B, 600C, 700A, 700B, 800A, 800B, 900, 1000, etc.) with a certain amount and type of data, it should be appreciated that one or more of the data structures (e.g., 400, 500, 600A, 600B, 600C, 700A, 700B, 800A, 800B, 900, 1000, etc.) may include a different amount and/or type of data in other embodiments. Additionally, although FIGS. 4 through 10 depict data structures (e.g., 400, 500, 600A, 600B, 600C, 700A, 700B, 800A, 800B, 900, 1000, etc.) with a certain arrangement of data, it should be appreciated that the data structures (e.g., 400, 500, 600A, 600B, 600C, 700A, 700B, 800A, 800B, 900, 1000, etc.) may include a different arrangement of data in other embodiments.

Use of Sentiment Data

Figure 11:
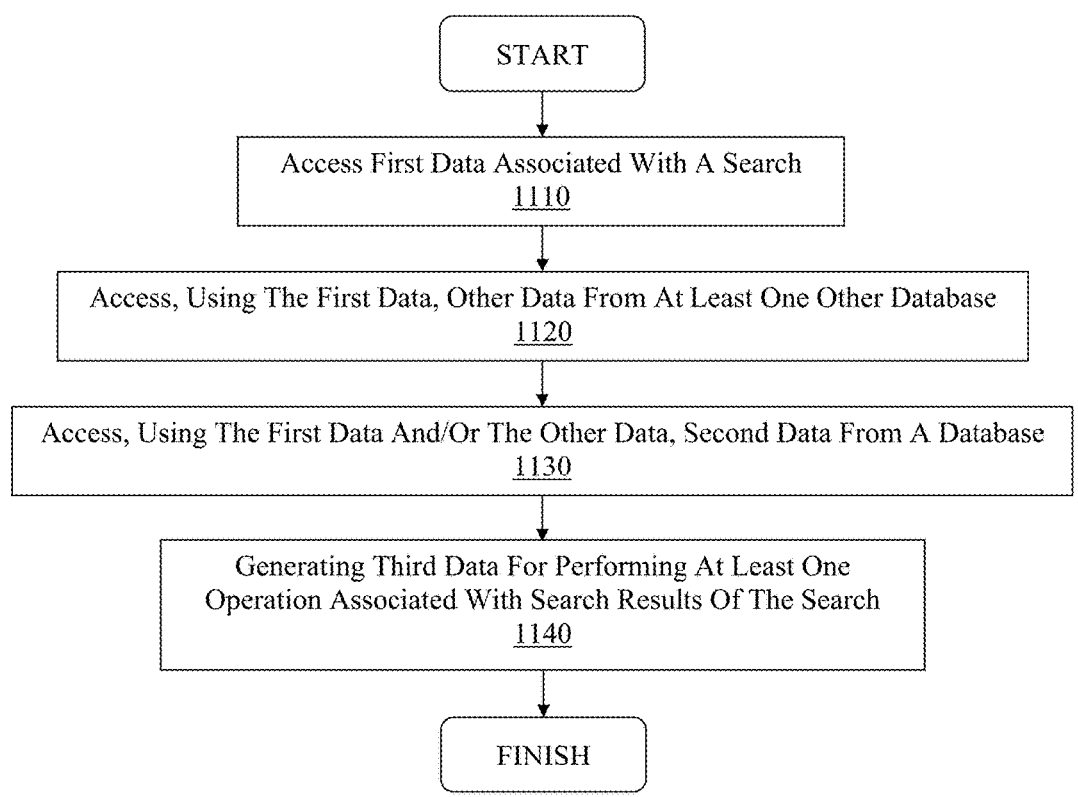
FIG. 11 shows a flowchart of a computer-implemented process for processing data in accordance with one embodiment of the present invention

FIG. 11 shows a flowchart of computer-implemented process 1100 for processing data in accordance with one embodiment of the present invention. FIG. 11 will be described in conjunction with FIG. 13A, where FIG. 13A shows exemplary system 1300A for processing data in accordance with one embodiment of the present invention.

Figure 13A:
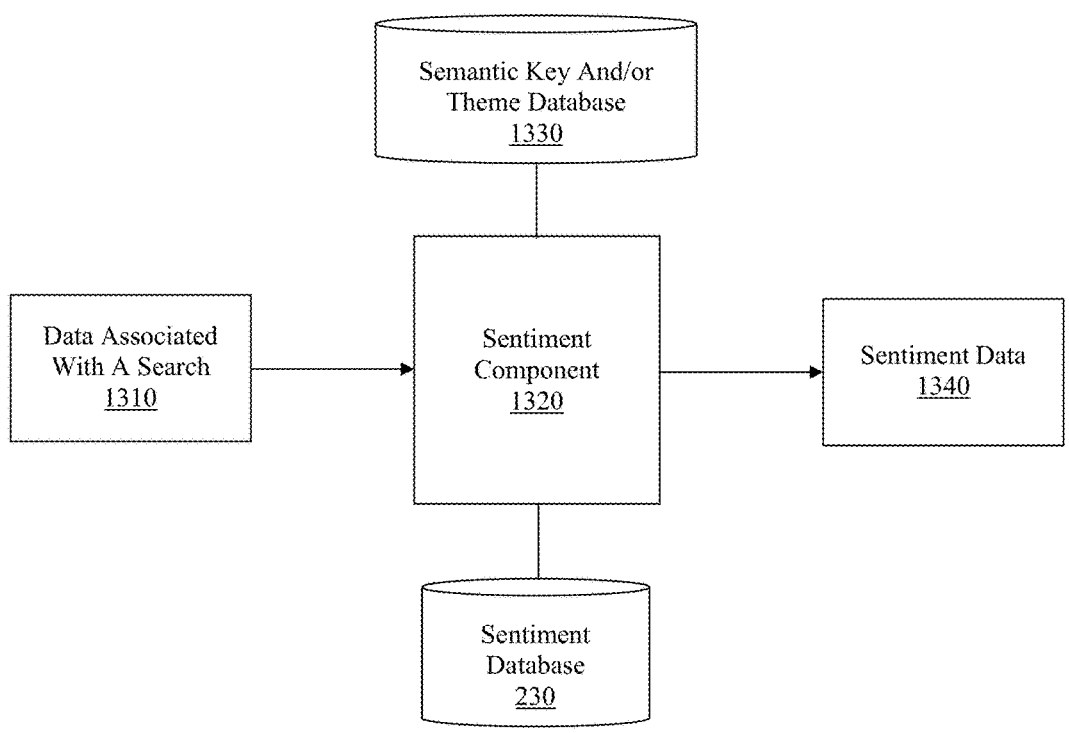
FIG. 13A shows exemplary system 1300A for processing data in accordance with one embodiment of the present invention.
Figure 13B:
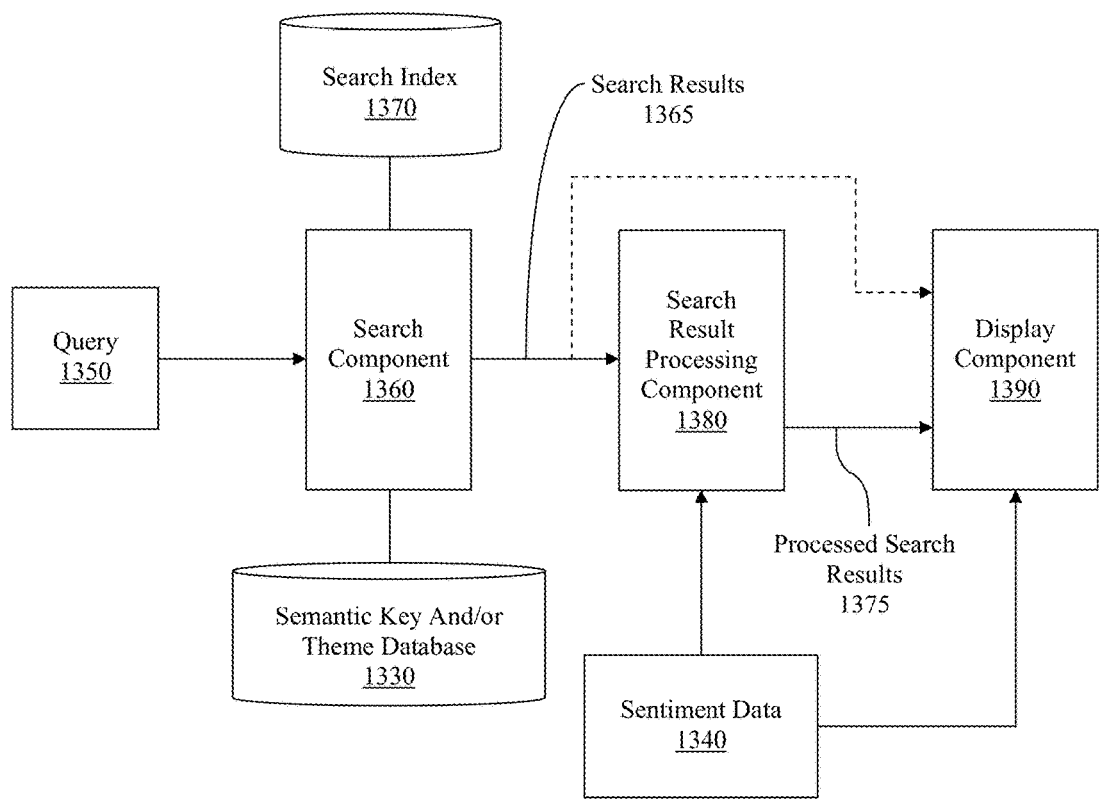
FIG. 13B shows an exemplary system for performing at least one operation in accordance with one embodiment of the present invention.

As shown in FIG. 11, step 1110 involves accessing first data (e.g., 1310 of FIG. 13A) associated with a search (e.g., to be performed by search component 1360 of FIG. 13B). The first data may include at least a portion of a query used for the search to generate search results (e.g., 1365 of FIG. 13B, at least one document 210 of FIG. 2, etc.), information associated with the search results (e.g., a list of identifiers of documents included in the search results, other information, etc.), at least a portion of the search results, at least one command, some combination thereof, etc. In one embodiment, the at least one command may include at least one command accessed and/or used by a sentiment component (e.g., 1320) to generate and/or process sentiment data (e.g., at least one score, at least one category, at least one degree, at least one classification, etc.). For example, the at least one command may include a request for at least one document associated with at least one sentiment category (e.g., positive, negative, neutral, some combination thereof, etc.), a request for at least one document associated with at least one sentiment degree (e.g., 1, 2, 3, 4, low, medium, high, some combination thereof, etc.), a request for at least one document associated with at least one sentiment classification (e.g., an action taker, an action receiver, a description, an identity, some combination thereof, etc.), some combination thereof, etc. In one embodiment, the at least one command may include at least one command input by a user via a graphical user interface (e.g., 1400A of FIG. 14A, 1400B of FIG. 14B, 1500 of FIG. 15, etc.), some combination thereof, etc. In one embodiment, the search results may include at least one document (e.g., 210 of FIG. 2) such as at least one webpage, at least one electronic document, at least one electronic file, advertising content, some combination thereof, etc.

In one embodiment, the first data accessed in step 1110 may include at least one theme, at least one theme element, at least one semantic key, at least one semantic sub-key, some combination thereof, etc. And in one embodiment, the first data may be accessed in step 1110 by a sentiment component (e.g., 1320 of FIG. 13A).

As shown in FIG. 11, step 1120 involves accessing, using the first data (e.g., accessed in step 1110), other data from at least one other database (e.g., semantic key and/or theme database 1330 as shown in FIG. 13A, another database, etc.). In one embodiment, the first data may include at least one semantic key, and the other data may include at least one semantic sub-key associated with the at least one semantic key. In one embodiment, the first data may include at least one semantic sub-key, and the other data may include at least one semantic key associated with the at least one semantic sub-key. In one embodiment, the first data may include at least one theme, and the other data may include at least one theme element associated with the at least one theme. In one embodiment, the first data may include at least one theme element, and the other data may include at least one theme associated with the at least one theme element. And in one embodiment, the other data may not be a part of (e.g., be different from) the first data and/or at least one document associated with the first data.

Step 1130 involves accessing, using the first data (e.g., accessed in step 1110) and/or the other data (e.g., accessed in step 1120), second data from a database (e.g., sentiment database 230 as shown in FIG. 13A). In one embodiment, step 1130 may involve indexing the database using the first data and/or the other data to retrieve or access the second data. The second data may include at least one score, at least one category associated with at least one sentiment, at least one degree, at least one classification, data stored in a sentiment database (e.g., 230, etc.), data stored in at least one data structure (e.g., 400, 500, 600A, 600B, 600C, 700A, 700B, 800A, 800B, 900, 1000, etc.), some combination thereof, etc.

As such, in one embodiment, use of the other data (e.g., alone or in combination with the first data) to access the second data may provide one or more advantages. For example, where the other data is associated with a theme or theme element of a document, the second data (e.g., accessed in step 1130) may more accurately or precisely represent the sentiment of one or more portions of the document since it is accessed or determined based on a theme or theme element of the document. As another example, where the other data is associated with a semantic key (e.g., which may be a focus, concept, etc.) or semantic sub-key (e.g., which may be a word or phrase associated with the semantic key) of a query (e.g., used to generate search results including at least one document), the second data (e.g., accessed in step 1130) may more accurately or precisely represent the sentiment of one or more portions of the document since it is accessed or determined based on a semantic key or semantic sub-key of the query. Additionally, since the other data may not be found in the document itself in one embodiment, the quality and/or quantity of information provided by the second data may be further increased since more data (e.g., the other data in combination with the first data) may be used to determine or access the second data.

In one embodiment, step 1120 may be optional and omitted. In this case, step 1130 may involve accessing the second data using the first data (e.g., and not the other data).

Figure 12:
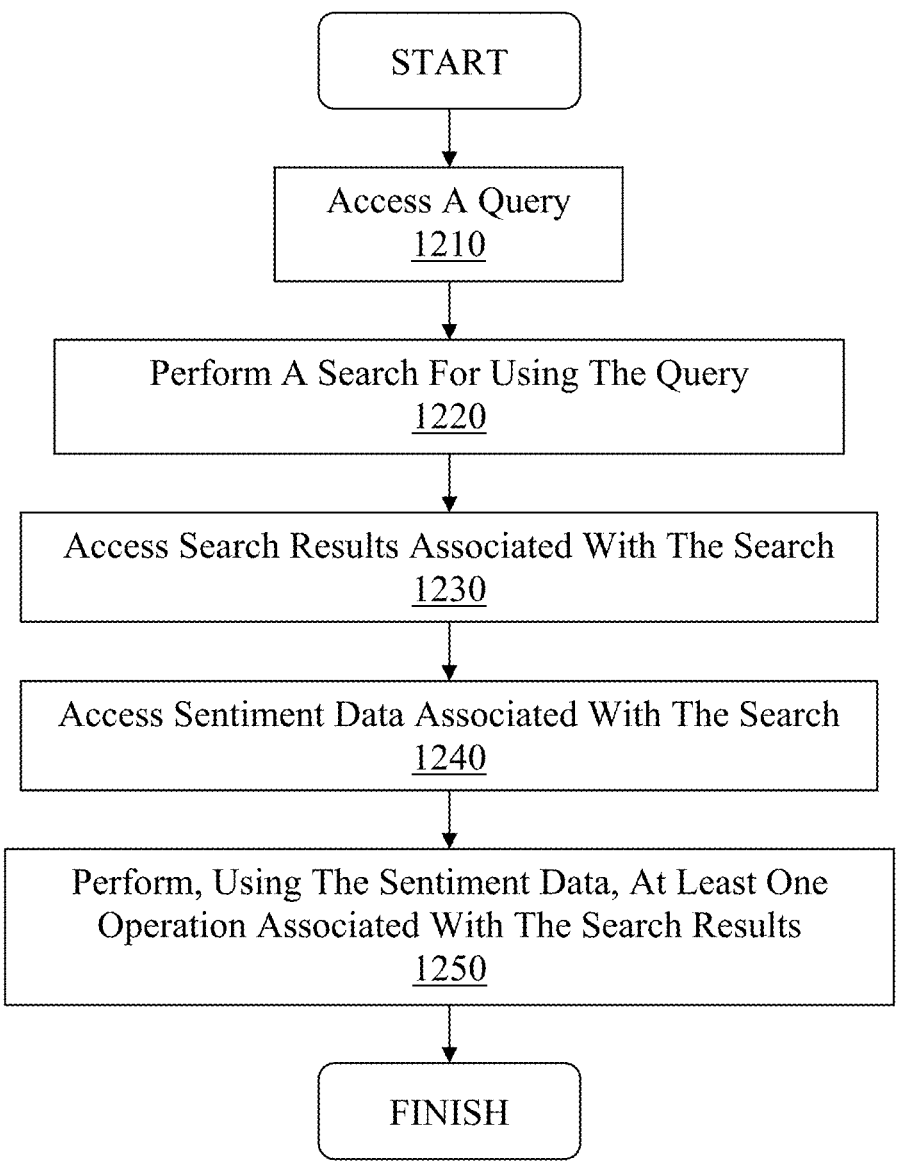
FIG. 12 shows a flowchart of a computer-implemented process for performing at least one operation in accordance with one embodiment of the present invention.

As shown in FIG. 11, step 1140 involves generating third data (e.g., sentiment data 1340 of FIG. 13A) for performing at least one operation (e.g., as described with respect to step 1240 of process 1200 of FIG. 12) associated with search results (e.g., including at least one document) of the search. In one embodiment, the third data may be generated in step 1140 based on the first data (e.g., accessed in step 1110), the other data (e.g., accessed in step 1120), the second data (e.g., accessed in step 1130), some combination thereof, etc.

FIG. 12 shows a flowchart of computer-implemented process 1200 for performing at least one operation in accordance with one embodiment of the present invention. FIG. 12 will be described in conjunction with FIG. 13B, where FIG. 13B shows exemplary system 1300B for performing at least one operation in accordance with one embodiment of the present invention.

As shown in FIG. 12, step 1210 involves accessing a query (e.g., 1350). The query may be included in or include data associated with a search (e.g., 1310 of FIG. 13A). The query may include at least one word, at least one phrase, at least one name, semantic data, score data, classification data, a portion of data (e.g., an effecting portion; an affected portion; a portion of data similar to the first portion, second portion, third portion, fourth portion, etc. as discussed with respect to process 100; etc.), some combination thereof, etc. The query may be accessed in step 1210 by a search component (e.g., 1360). An in one embodiment, the query accessed in step 1210 may be input using a region (e.g., 1411, 1431, 1510, some combination thereof, etc.) of a graphical user interface (e.g., 1400A, 1400B, 1500, some combination thereof, etc.).

Step 1220 involves performing a search using the query (e.g., accessed in step 1210). The search may be performed (e.g., by search component 1360), in one embodiment, using search index 1370. For example, the query or a portion thereof may be used to index the search index (e.g., 1370) to access at least one document or data associated therewith. Step 1220 may involve generating search results (e.g., 1365) that include one or more documents.

Search index 1370 may be a keyword search index (e.g., used to perform a keyword search) in one embodiment. In one embodiment, search index 1370 may include information associated with a theme (e.g., at least one theme, at least one theme element, etc.), where the information may be used to perform a search based on at least one theme and/or at least one theme element. Search index 1370 may include information associated with a semantic key (e.g., at least one semantic key, at least one semantic sub-key, etc.) in one embodiment, where the information may be used to perform a search based on at least one semantic key and/or at least one semantic sub-key.

As shown in FIG. 12, step 1230 involves accessing search results associated with the search. The search results (e.g., 1365) may include at least one document (e.g., 210 of FIG. 2, etc.) or data associated therewith. The search results may be generated and/or output by a search component (e.g., 1360 in step 1220).

Step 1240 involves accessing sentiment data associated with the search (e.g., performed in step 1220). In one embodiment, the sentiment data accessed in step 1240 may be generated in accordance with one or more steps of process 1100 of FIG. 11. As such, the sentiment data may be the "third data" generated in step 1140 in one embodiment, and therefore, may be determined or generated based on the "first data associated with a search" (e.g., a query used for the search to generate search results, information associated with the search results, at least a portion of the search results, at least one command, etc.) as accessed in step 1110.

In one embodiment, the sentiment data accessed in step 1240 may be associated with or determined based on the search query (e.g., 1350 accessed in step 1210). For example, the query (e.g., 1310) may be provided to a sentiment component (e.g., 1320 as part of data associated with a search 1310), and therefore, the sentiment data (e.g., 1340) may be generated by the sentiment component (e.g., 1320) based on the query (e.g., 1310) in one embodiment. As a more specific example, the sentiment data (e.g., 1340) may include sentiment data (e.g., at least one score, at least one category, at least one degree, at least one classification, etc.) associated with one or more portions (e.g., including at least one word, at least one phrase, etc.) of the search query, one or more themes associated with the search query (e.g., as determined by sentiment component 1320 using data accessed from database 1330 as shown in FIG. 13A, as determined by search component 1360 using data accessed from database 1330 as shown in FIG. 13B, some combination thereof, etc.), one or more theme elements associated with the search query (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic keys associated with the search query (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic sub-keys associated with the search query (e.g., as determined by sentiment component 1320 using data accessed from database 1330 as shown in FIG. 13A, as determined by search component 1360 using data accessed from database 1330 as shown in FIG. 13B, some combination thereof, etc.), etc.

In one embodiment, the sentiment data accessed in step 1240 may be associated with or determined based on at least a portion of the search results (e.g., 1365 accessed in step 1230) and/or information associated with search results (e.g., a list of identifiers of documents included in the search results, other information, etc.). For example, at least a portion of the search results (e.g., 1365) and/or information associated with search results may be provided to a sentiment component (e.g., 1320 as part of data associated with a search 1310), and therefore, the sentiment data (e.g., 1340) may be generated by the sentiment component (e.g., 1320) based on the search results (e.g., 1365) and/or information associated with search results in one embodiment. As a more specific example, the sentiment data (e.g., 1340) may include sentiment data (e.g., at least one score, at least one category, at least one degree, at least one classification, etc.) associated with at least one portion of the search results and/or information associated therewith, one or more themes associated with at least one portion of the search results and/or information associated therewith (e.g., as determined by sentiment component 1320 using data accessed from database 1330 as shown in FIG. 13A, as determined by search component 1360 using data accessed from database 1330 as shown in FIG. 13B, some combination thereof, etc.), one or more theme elements associated with at least one portion of the search results and/or information associated therewith (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic keys associated with at least one portion of the search results and/or information associated therewith (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic sub-keys associated with at least one portion of the search results and/or information associated therewith (e.g., as determined by sentiment component 1320 using data accessed from database 1330 as shown in FIG. 13A, as determined by search component 1360 using data accessed from database 1330 as shown in FIG. 13B, some combination thereof, etc.), etc.

Figure 14A:
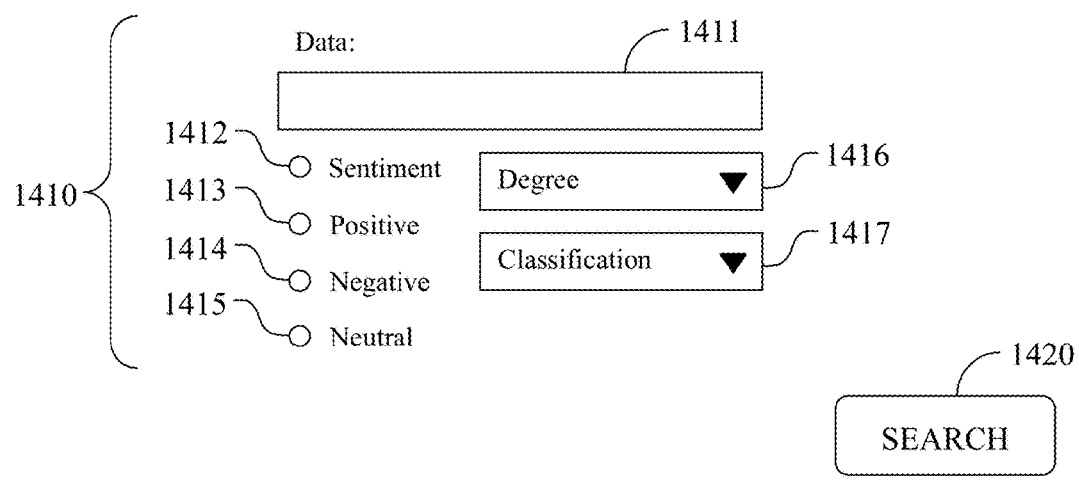
FIG. 14A shows an exemplary on-screen graphical user interface for accessing data associated with a search in accordance with one embodiment of the present invention.
Figure 14B:
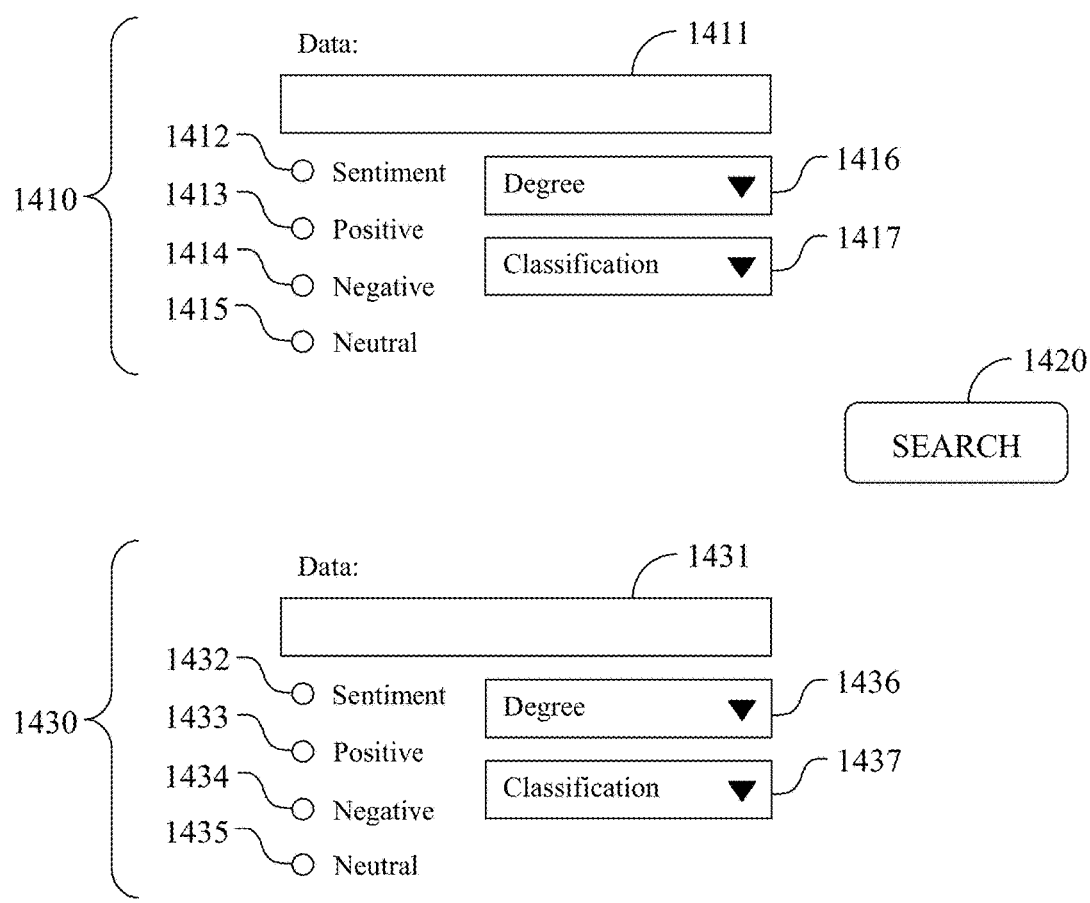
FIG. 14B shows exemplary an on-screen graphical user interface for accessing at least one portion of data associated with a search in accordance with one embodiment of the present invention.
Figure 15:
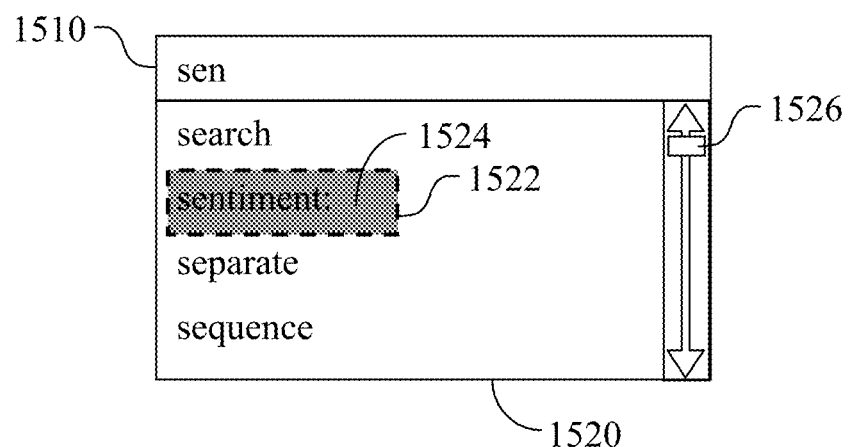
FIG. 15 shows an exemplary on-screen graphical user interface for automatically suggesting at least one command in accordance with one embodiment of the present invention.

In one embodiment, the sentiment data accessed in step 1240 may be associated with or determined based on at least one command (e.g., a request for at least one document associated with at least one sentiment category; a request for at least one document associated with at least one sentiment degree; a request for at least one document associated with at least one sentiment classification; at least one command input by a user via a graphical user interface such as graphical user interface 1400A of FIG. 14A, graphical user interface 1400B of FIG. 14B and/or graphical user interface 1500 of FIG. 15; some combination thereof; etc.). For example, the at least one command may be provided to a sentiment component (e.g., 1320 as part of data associated with a search 1310), and therefore, the sentiment data (e.g., 1340) may be generated by the sentiment component (e.g., 1320) based on the at least one command in one embodiment. As a more specific example, the sentiment data (e.g., 1340) may include sentiment data (e.g., at least one score, at least one category, at least one degree, at least one classification, etc.) associated with the at least one command, one or more themes associated with the at least one command (e.g., as determined by sentiment component 1320 using data accessed from database 1330 as shown in FIG. 13A, as determined by search component 1360 using data accessed from database 1330 as shown in FIG. 13B, some combination thereof, etc.), one or more theme elements associated with the at least one command (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic keys associated with the at least one command (e.g., as determined by sentiment component 1320 using data accessed from database 1330 as shown in FIG. 13A, as determined by search component 1360 using data accessed from database 1330 as shown in FIG. 13B, some combination thereof, etc.), one or more semantic sub-keys associated with the at least one command (e.g., as determined by sentiment component 1320 using data accessed from database 1330 as shown in FIG. 13A, as determined by search component 1360 using data accessed from database 1330 as shown in FIG. 13B, some combination thereof, etc.), etc.

FIG. 14A shows exemplary on-screen graphical user interface (GUI) 1400A for accessing data associated with a search (e.g., 1310) in accordance with one embodiment of the present invention. As shown in FIG. 14A, regions 1410 may allow entry of data associated with a search (e.g., 1310), where the data associated with the search may include at least a portion of at least one query (e.g., 1350), at least one command (e.g., a request for at least one document associated with at least one sentiment category, a request for at least one document associated with at least one sentiment degree, a request for at least one document associated with at least one sentiment classification, some combination thereof, etc.), some combination thereof, etc. Region 1420 may be used to execute or perform a search based on data entered using region 1410.

In one embodiment, a query may be entered (e.g., using region 1411) without any commands associated with sentiment. For example, if the text "Toyota Land Cruiser performance" is entered into either region 1411, a search (e.g., a keyword search, a search based on at least one theme and/or at least one theme element, a search based on at least one semantic key and/or at least one semantic sub-key, some combination thereof, etc.) may be performed to generate search results including at least one document including the words or phrases "Toyota Land Cruiser" and "performance" or other data associated therewith (e.g., at least one theme associated with "Toyota Land Cruiser" and/or "performance," at least one theme element associated with "Toyota Land Cruiser" and/or "performance," at least one semantic key associated with "Toyota Land Cruiser" and/or "performance," at least one semantic sub-key associated with "Toyota Land Cruiser" and/or "performance," some combination thereof, etc.).

In one embodiment, region 1410 may be used to enter or input a query and at least one command associated with any category of sentiment (e.g., positive, negative, neutral, some combination thereof, etc.). For example, region 1411 may be used to enter a query (e.g., "Toyota Land Cruiser") and at least one command associated with any category of sentiment by separating the at least one command and the query by a colon or other symbol (e.g., entering the text "sentiment: Toyota Land Cruiser" into region 1411). Alternatively, region 1411 may be used to enter a query (e.g., "Toyota Land Cruiser") while region 1412 may be used to enter or select at least one command associated with any category of sentiment. In either case, sentiment data (e.g., 1340) may be accessed (e.g., in step 1240) based on at least a portion of the query and/or the at least one command. The sentiment data may be associated with or include at least one sentiment (e.g., associated with at least one category of positive, negative, neutral or some combination thereof as selected or indicated using region 1411 and/or region 1412) of the Toyota Land Cruiser. As such, the sentiment data may be used to perform (e.g., in step 1250 as discussed herein) at least one operation (e.g., filtering, ranking, generating data for displaying an image, displaying an image, some combination thereof, etc.) associated with search results (e.g., accessed in step 1230, generated responsive to an interaction with region 1420, etc.). In one embodiment, the search results (e.g., processed search results 1375 of FIG. 13B) may include at least one document including at least one affected portion (e.g., associated with any category of sentiment as selected or indicated using region 1411 and/or region 1412), where the at least one affected portion may include the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.). As such, the search may provide search results associated with any category of sentiment (e.g., selected or indicated using region 1411 and/or region 1412) of the Toyota Land Cruiser.

In one embodiment, region 1410 may be used to enter or input a query and at least one command associated with at least one particular category of sentiment (e.g., positive, negative, neutral, some combination thereof, etc.). For example, region 1411 may be used to enter a query (e.g., "Toyota Land Cruiser") and at least one command associated with at least one particular category of sentiment (e.g., the word "positive" or the like to request results associated with a positive sentiment, the word "negative" or the like to request results associated with a negative sentiment, the word "neutral" or the like to request results associated with a neutral sentiment, some combination thereof, etc.) by separating the at least one command and the query by a colon or other symbol (e.g., entering the text "positive: Toyota Land Cruiser" into region 1411, entering the text "negative: Toyota Land Cruiser" into region 1411, entering the text "neutral: Toyota Land Cruiser" into region 1411, etc.). Alternatively, region 1411 may be used to enter a query (e.g., "Toyota Land Cruiser") while at least one other region (e.g., 1413, 1414, 1415, some combination thereof, etc.) may be used to enter or select at least one command associated with at least one particular category of sentiment (e.g., positive, negative, neutral, some combination thereof, etc.). In either case, sentiment data (e.g., 1340) may be accessed (e.g., in step 1240) based on at least a portion of the query and/or the at least one command. The sentiment data may be associated with or include at least one sentiment (e.g., associated with at least one category of positive, negative, neutral or some combination thereof as selected or indicated using region 1411, region 1413, region 1414, region 1415, some combination thereof, etc.) of the Toyota Land Cruiser. As such, the sentiment data may be used to perform (e.g., in step 1250 as discussed herein) at least one operation (e.g., filtering, ranking, generating data for displaying an image, displaying an image, some combination thereof, etc.) associated with search results (e.g., accessed in step 1230, generated responsive to an interaction with region 1420, etc.). In one embodiment, the search results (e.g., processed search results 1375 of FIG. 13B) may include at least one document including at least one affected portion (e.g., associated with at least one particular category of sentiment selected or indicated using region 1411, region 1413, region 1414, region 1415, some combination thereof, etc.), where the at least one affected portion may include the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.). As such, the search may provide search results associated with at least one particular category of sentiment (e.g., selected or indicated using region 1411, region 1413, region 1414, region 1415, some combination thereof, etc.) of the Toyota Land Cruiser.

In one embodiment, region 1410 may be used to enter or input a query and at least one command associated with at least one particular degree of sentiment (e.g., 1, 2, 3, 4, low, medium, high, etc.). For example, region 1411 may be used to enter a query (e.g., "Toyota Land Cruiser") and at least one command associated with at least one particular degree of sentiment (e.g., the word "low" or the like to request results associated with a low degree of sentiment, the word "medium" or the like to request results associated with a medium degree of sentiment, the word "high" or the like to request results associated with a high degree of sentiment, some combination thereof, etc.) by separating the at least one command and the query by a colon or other symbol (e.g., entering the text "low: Toyota Land Cruiser" into region 1411, entering the text "medium: Toyota Land Cruiser" into region 1411, entering the text "high: Toyota Land Cruiser" into region 1411, etc.). Alternatively, region 1411 may be used to enter a query (e.g., "Toyota Land Cruiser") while another region (e.g., 1416) may be used to enter or select at least one command associated with at least one particular degree of sentiment (e.g., 1, 2, 3, 4, low, medium, high, some combination thereof, etc.). In either case, sentiment data (e.g., 1340) may be accessed (e.g., in step 1240) based on at least a portion of the query and/or the at least one command. The sentiment data may be associated with or include at least one sentiment (e.g., associated with at least one degree of 1, 2, 3, 4, low, medium, high, or some combination thereof as selected or indicated using region 1411 and/or region 1416) of the Toyota Land Cruiser. As such, the sentiment data may be used to perform (e.g., in step 1250 as discussed herein) at least one operation (e.g., filtering, ranking, generating data for displaying an image, displaying an image, some combination thereof, etc.) associated with search results (e.g., accessed in step 1230, generated responsive to an interaction with region 1420, etc.). In one embodiment, the search results (e.g., processed search results 1375 of FIG. 13B) may include at least one document including at least one affected portion (e.g., associated with at least one particular degree of sentiment selected or indicated using region 1411 and/or region 1416), where the at least one affected portion may include the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.). As such, the search may provide search results associated with at least one particular degree of sentiment (e.g., selected or indicated using region 1411 and/or region 1416) of the Toyota Land Cruiser.

In one embodiment, region 1410 may be used to enter or input a query and at least one command associated with at least one particular classification of sentiment (e.g., an action taker, an action receiver, a description, an identity, some combination thereof, etc.). For example, region 1411 may be used to enter a query (e.g., "Toyota Land Cruiser") and at least one command associated with at least one particular classification of sentiment (e.g., the words "action taker" or the like to request results associated with a sentiment classification of "action taker," the words "action receiver" or the like to request results associated with a sentiment classification of "action receiver," the word "description" or the like to request results associated with a sentiment classification of "description," the word "identity" or the like to request results associated with a sentiment classification of "identity," some combination thereof, etc.) by separating the at least one command and the query by a colon or other symbol (e.g., entering the text "action taker:

Toyota Land Cruiser" into region 1411, entering the text "action receiver: Toyota Land Cruiser" into region 1411, entering the text "description: Toyota Land Cruiser" into region 1411, entering the text "identity: Toyota Land Cruiser" into region 1411, etc.). Alternatively, region 1411 may be used to enter a query (e.g., "Toyota Land Cruiser") while another region (e.g., 1417) may be used to enter or select at least one command associated with at least one particular classification of sentiment (e.g., an action taker, an action receiver, a description, an identity, some combination thereof, etc.). In either case, sentiment data (e.g., 1340) may be accessed (e.g., in step 1240) based on at least a portion of the query and/or the at least one command. The sentiment data may be associated with or include at least one sentiment (e.g., associated with at least one classification of action taker, action receiver, description, identity, some combination thereof, etc. as selected or indicated using region 1411 and/or region 1417) of the Toyota Land Cruiser. As such, the sentiment data may be used to perform (e.g., in step 1250 as discussed herein) at least one operation (e.g., filtering, ranking, generating data for displaying an image, displaying an image, some combination thereof, etc.) associated with search results (e.g., accessed in step 1230, generated responsive to an interaction with region 1420, etc.). In one embodiment, the search results (e.g., processed search results 1375 of FIG. 13B) may include at least one document including at least one affected portion (e.g., associated with at least one particular classification of sentiment selected or indicated using region 1411 and/or region 1417), where the at least one affected portion may include the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.). As such, the search may provide search results associated with at least one particular classification of sentiment (e.g., selected or indicated using region 1411 and/or region 1417) of the Toyota Land Cruiser.

Region 1410 may be used to enter or input a plurality of commands. For example, at least one command associated with a category of sentiment may be input (e.g., using region 1411, region 1412, region 1413, region 1414, region 1415, some combination thereof, etc.) in conjunction with at least one command associated with a degree of sentiment (e.g., input using region 1416) and/or at least one command associated with a classification of sentiment (e.g., input using region 1417). As another example, at least one command associated with a degree of sentiment may be input (e.g., using region 1416) in conjunction with at least one command associated with a category of sentiment (e.g., input using region 1411, region 1412, region 1413, region 1414, region 1415, some combination thereof, etc.) and/or at least one command associated with a classification of sentiment (e.g., input using region 1417). As yet another example, at least one command associated with a classification of sentiment may be input (e.g., using region 1417) in conjunction with at least one command associated with a degree of sentiment (e.g., input using region 1416) and/or at least one command associated with a category of sentiment (e.g., input using region 1411, region 1412, region 1413, region 1414, region 1415, some combination thereof, etc.).

The plurality of commands may cause a filtering of the sentiment data or a return of less sentiment data in one embodiment. For example, where commands for a specific category of sentiment and a specific degree of sentiment are input, sentiment data returned responsive thereto may include sentiment data associated with the specific category and also with the specific degree. As such, in one embodiment, the sentiment data (e.g., accessed in step 1240) may be free of or not include at least one portion (e.g., that is not associated with all of the commands input or accessed) as a result of the plurality of commands.

In one embodiment, region 1411 may be used to input the plurality of commands. For example, the text "positive medium description: Toyota Land Cruiser" (e.g., entered into region 1411) may be used to input the command "positive" (e.g., a request for at least one document associated with positive sentiment of the Toyota Land Cruiser), the command "medium" (e.g., a request for at least one document associated with a medium degree of sentiment of the Toyota Land Cruiser), and the command "description" (e.g., a request for at least one document associated with sentiment of the Toyota Land Cruiser that can be classified as a description or the like). Alternatively, the plurality of commands may be input using region 1411 in combination with at least one other region (e.g., 1412, 1413, 1414, 1415, 1416, 1417, some combination thereof, etc.).

Region 1410 may be used to input at least one command associated with one portion of a query and not with another in one embodiment. For example, the text "positive: Toyota Land Cruiser, performance" may be entered into region 1411, where the command "positive" may be associated with the query portion "Toyota Land Cruiser" and not associated with the query portion "performance." Based on the text entered into region 1411, a search (e.g., a keyword search, a search based on at least one theme and/or at least one theme element, a search based on at least one semantic key and/or at least one semantic sub-key, some combination thereof, etc.) may be performed (responsive to an interaction with region 1420) to generate search results including at least one document including: at least one affected portion (e.g., associated with a positive category of sentiment) including the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.); and the word "performance" or other data associated therewith (e.g., at least one theme associated with "performance," at least one theme element associated with "performance," at least one semantic key associated with "performance," at least one semantic sub-key associated with "performance," some combination thereof, etc.). As such, region 1410 may be used to limit search results associated with sentiment data, use sentiment data to limit keyword search results or other types of search results, provide more relevant search results, etc.

In one embodiment, region 1410 may be used to input a plurality of commands associated with a plurality of portions of a query. For example, the text "neutral: Toyota Land Cruiser, positive: performance" may be entered into region 1411, where the command "neutral" may be associated with the query portion "Toyota Land Cruiser" and the command "positive" may be associated with the query portion "performance." Based on the text entered into region 1411, a search (e.g., a keyword search, a search based on at least one theme and/or at least one theme element, a search based on at least one semantic key and/or at least one semantic sub-key, some combination thereof, etc.) may be performed (responsive to an interaction with region 1420) to generate search results including at least one document including: at least one affected portion (e.g., associated with a neutral category of sentiment) including the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.); and at least one affected portion (e.g., associated with a positive category of sentiment) including the words or phrase "performance" or other data associated therewith (e.g., at least one theme associated with "performance," at least one theme element associated with "performance," at least one semantic key associated with "performance," at least one semantic sub-key associated with "performance," some combination thereof, etc.).

FIG. 14B shows exemplary on-screen graphical user interface (GUI) 1400B for accessing at least one portion of data associated with a search (e.g., 1310) in accordance with one embodiment of the present invention. A shown in FIG. 14B, GUI 1400B may include regions 1410, 1420 and 1430. Region 1430 may operate similarly to or identically to region 1410 in one embodiment. For example, region 1431 may correspond to region 1411, region 1432 may correspond to region 1412, region 1433 may correspond to region 1413, region 1434 may correspond to region 1414, region 1435 may correspond to region 1415, region 1436 may correspond to region 1416, region 1437 may correspond to region 1417, etc. In this manner, GUI 1400B may be used to input a first portion of data (e.g., including a query and/or at least one command) and a second portion of data (e.g., including at least one other query and/or at least one other command), where the first and second portions of data may be used to access sentiment data (e.g., in step 1240) and/or perform at least one operation associated with search results (e.g., in step 1250).

The first and second portions of data (e.g., input using regions 1410 and 1430, respectively) may be used to implement a Boolean function (e.g., and "AND" function) in one embodiment. For example, if region 1410 is used to enter the query portion "Toyota Land Cruiser" and the command "positive" (e.g., using region 1411, using region 1413, etc.) while region 1430 is used to enter the query portion "performance," then a search (e.g., a keyword search, a search based on at least one theme and/or at least one theme element, a search based on at least one semantic key and/or at least one semantic sub-key, some combination thereof, etc.) may be performed (responsive to an interaction with region 1420) to generate search results including at least one document including: at least one affected portion (e.g., associated with a positive category of sentiment) including the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.); and the word "performance" or other data associated therewith (e.g., at least one theme associated with "performance," at least one theme element associated with "performance," at least one semantic key associated with "performance," at least one semantic sub-key associated with "performance," some combination thereof, etc.). As another example, if region 1410 is used to enter the query portion "Toyota Land Cruiser" and the command "neutral" (e.g., using region 1411, using region 1415, etc.) while region 1430 is used to enter the query portion "performance" and the command "positive" (e.g., using region 1431, using region 1433, etc.), then a search (e.g., a keyword search, a search based on at least one theme and/or at least one theme element, a search based on at least one semantic key and/or at least one semantic sub-key, some combination thereof, etc.) may be performed (responsive to an interaction with region 1420) to generate search results including at least one document including: at least one affected portion (e.g., associated with a neutral category of sentiment) including the words or phrase "Toyota Land Cruiser" or other data associated therewith (e.g., at least one theme associated with "Toyota Land Cruiser," at least one theme element associated with "Toyota Land Cruiser," at least one semantic key associated with "Toyota Land Cruiser," at least one semantic sub-key associated with "Toyota Land Cruiser," some combination thereof, etc.); and at least one affected portion (e.g., associated with a positive category of sentiment) including the words or phrase "performance" or other data associated therewith (e.g., at least one theme associated with "performance," at least one theme element associated with "performance," at least one semantic key associated with "performance," at least one semantic sub-key associated with "performance," some combination thereof, etc.).

FIG. 15 shows exemplary on-screen graphical user interface (GUI) 1500 for automatically suggesting at least one command in accordance with one embodiment of the present invention. As shown in FIG. 15, at least one command (e.g., "sentiment") may be automatically suggested using region 1520. The at least one command may be identified by one or more elements (e.g., dashed line 1522, colored or grayed background 1524, some combination thereof, etc.). The at least one command may be automatically suggested based on text (e.g., the letters "sen") entered in region 1510 in one embodiment. And in one embodiment, element 1526 (e.g., a slider, scroll bar, etc.) may be used to scroll through and/or select one or more items listed in region 1520 (e.g., including the command "sentiment," other than the command "sentiment," etc.).

Accordingly, embodiments enable more efficient selection and entry of at least one command. Additionally, embodiments allow users to determine and/or select commands without prior knowledge of the commands. For example, where a user is not aware that the word "sentiment" is a command, region 1520 may display the command "sentiment" (and/or one or more other commands related thereto such as positive, negative, neutral, etc.) responsive to entry of one or more letters in region 1510 (e.g., the letter "s," the letters "se," the letters "sen," etc.). As such, region 1520 may be used to inform a user of one or more possible commands for selection and/or use.

As shown in FIGS. 14A, 14B and 15, each region (e.g., of GUI 1400A, 1400B, 1500, some combination thereof, etc.) may include one or more respective form fields. Each form field may be or include at least one text entry box, at least one drop-down list box, at least one radio button, at least one checkbox, etc.

Although FIGS. 14A, 14B and 15 show GUIs (e.g., 1400A, 1400B and 1500, respectively) with a specific number and arrangement of elements, it should be appreciated that the GUIs (e.g., 1400A, 1400B and 1500) may include a different number and arrangement of elements in other embodiments. For example, a GUI (e.g., 1400A, 1400B, 1500, etc.) may include more than three regions similar to region 1410 and/or region 1430. As another example, one or more regions of a GUI (e.g., 1400A, 1400B, 1500, etc.) may include a different number of sub-regions.

Additionally, although FIGS. 14A, 14B and 15 show GUIs (e.g., 1400A, 1400B and 1500, respectively) with specific functionality, it should be appreciated that the GUIs (e.g., 1400A, 1400B and 1500) may include elements with different or additional functionality in other embodiments. For example, at least one region (e.g., 1416, 1417, 1426, 1427, etc.) may be implemented using another type of form field (e.g., at least one radio button, at least one checkbox, etc.).

Further, although the GUIs (e.g., 1400A, 1400B, 1500, etc.) have been discussed with respect to one or more specific configurations of the query and/or command, it should be appreciated that the configuration of the query and/or command may be different in other embodiments. For example, the query and command may be entered (e.g., into region 1411, into region 1431, etc.) in a different order (e.g., query before at least one command, etc.), separated by a different symbol (e.g., other than a colon, etc.), consecutively (e.g., region 1411 and/or region 1431 may be cleared after entry of the at least one command to allow entry of the query, region 1411 and/or region 1431 may be cleared after entry of the query to allow entry of the at least one command, etc.), some combination thereof, etc. And further yet, it should be appreciated that the commands may be alternatively expressed (e.g., using different words, using different phrases, using different text, using a symbol such as "+" instead of a word such as "positive," etc.) in other embodiments.

Turning back to FIG. 12, step 1250 involves performing, using the sentiment data (e.g., accessed in step 1240), at least one operation associated with the search results (e.g., accessed in step 1230). In one embodiment, step 1250 may involve processing (e.g., using search result processing component 1380) the search results (e.g., 1365) based on the sentiment data (e.g., 1340) to generate processed search results (e.g., 1375). The processing may involve filtering the search results (e.g., removing at least one search result or data associated therewith from the search results) based on the sentiment data (e.g., accessed in step 1240), ranking the search results (e.g., reordering the search results or data associated therewith) based on the sentiment data (e.g., accessed in step 1240), some combination thereof, etc. For example, one or more search results (or data associated therewith) that are not associated with the sentiment data (e.g., accessed in step 1240) may be removed from the search results in step 1250. As another example, the search results (or data associated therewith) may be ordered based on a respective score, a respective category of sentiment, a respective degree of sentiment, a respective classification of sentiment, etc.

In one embodiment, step 1250 may involve generating data for displaying an image associated with the sentiment data (e.g., accessed in step 1240) and/or displaying the image. The data generated in step 1250 may include pixel data, texture data, at least one frame, at least one image, some combination thereof, etc. In one embodiment, display component 1390 may be used to generate data for displaying the image (e.g., associated with sentiment data 1340) and/or used to display the image in step 1250. In one embodiment, the data for displaying the image may be generated (e.g., by display component 1390) based on search results 1365 and/or processed search results 1375 (e.g., as shown in FIG. 13B). And in one embodiment, search results 1365 and/or processed search results 1375 may be directly displayed using display component 1390.

The image associated with the sentiment data (e.g., 1340) may include a background (e.g., region 1640 of GUI 1600B of FIG. 16B, region 1690 of GUI 1600C of FIG. 16C, etc.) of a webpage associated with the search results, a background (e.g., region 1651 of GUI 1600B of FIG. 16B, region 1652 of GUI 1600B of FIG. 16B, region 1653 of GUI 1600B of FIG. 16B, region 1654 of GUI 1600B of FIG. 16B, etc.) of a webpage associated with at least one search result, at least one icon (e.g., 1652 of FIG. 16B, 1662 of FIG. 16B, 1672 of FIG. 16B, 1682 of FIG. 16B, 1684 of FIG. 16B, etc.) associated with at least one search result, formatting (e.g., highlighting, bolding, underlining, italicizing, making larger, making smaller, superscripting, subscripting, changing the color of, capitalization, alternatively formatting, etc.) of text associated with at least one search result, some combination thereof, etc.

Figure 16A:
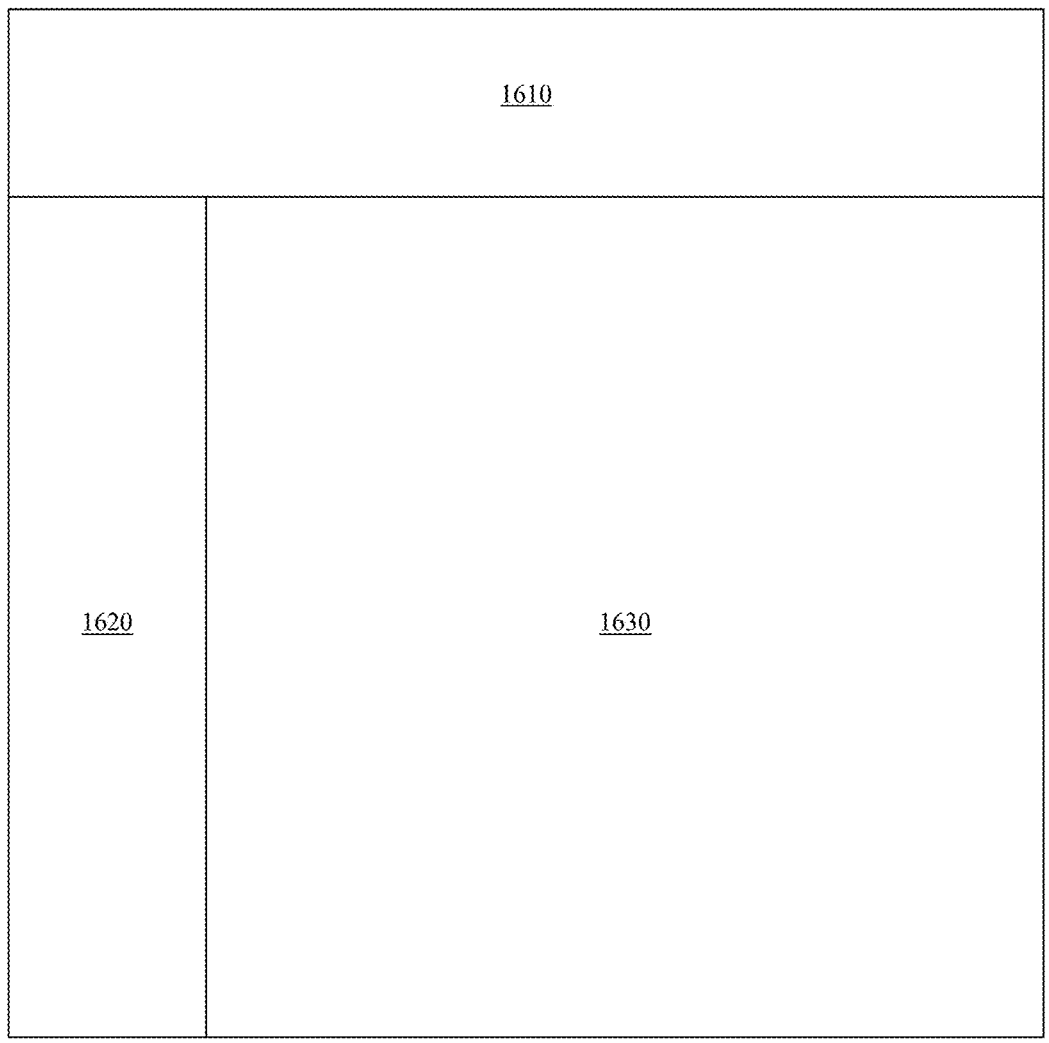
FIG. 16A shows an exemplary on-screen graphical user interface associated with at least one search result in accordance with one embodiment of the present invention.

FIG. 16A shows exemplary on-screen graphical user interface (GUI) 1600A associated with at least one search result in accordance with one embodiment of the present invention. As shown in FIG. 16A, GUI 1600A may include at least one region (e.g., 1610, 1620, 1630, etc.). In one embodiment, GUI 1600A may be used to implement or be displayed as at least a portion of a webpage.

In one embodiment, region 1610 may include at least one element (e.g., of GUI 1400A of FIG. 14A, of GUI 1400B of FIG. 14B, of GUI 1500 of FIG. 15, etc.) for accessing data associated with a search (e.g., 1310, in accordance with step 1110, etc.). For example, region 1610 may include at least one form field allowing the entry or input of at least one query and/or at least one command. Region 1610 may include at least one element (e.g., of GUI 1400A of FIG. 14A, of GUI 1400B of FIG. 14B, of GUI 1500 of FIG. 15, etc.) allowing a search for at least one document (e.g., performed in accordance with step 1220) to be initiated in one embodiment. For example, region 1610 may include at least one element (e.g., similar to region 1420 of FIG. 14A and/or FIG. 14B) allowing the initiation of a search for at least one document. And in one embodiment, region 1610 may be implemented by at least one GUI (e.g., 1400A of FIG. 14A, 1400B of FIG. 14B, 1500 of FIG. 15, another GUI, etc.).

Figure 16B:
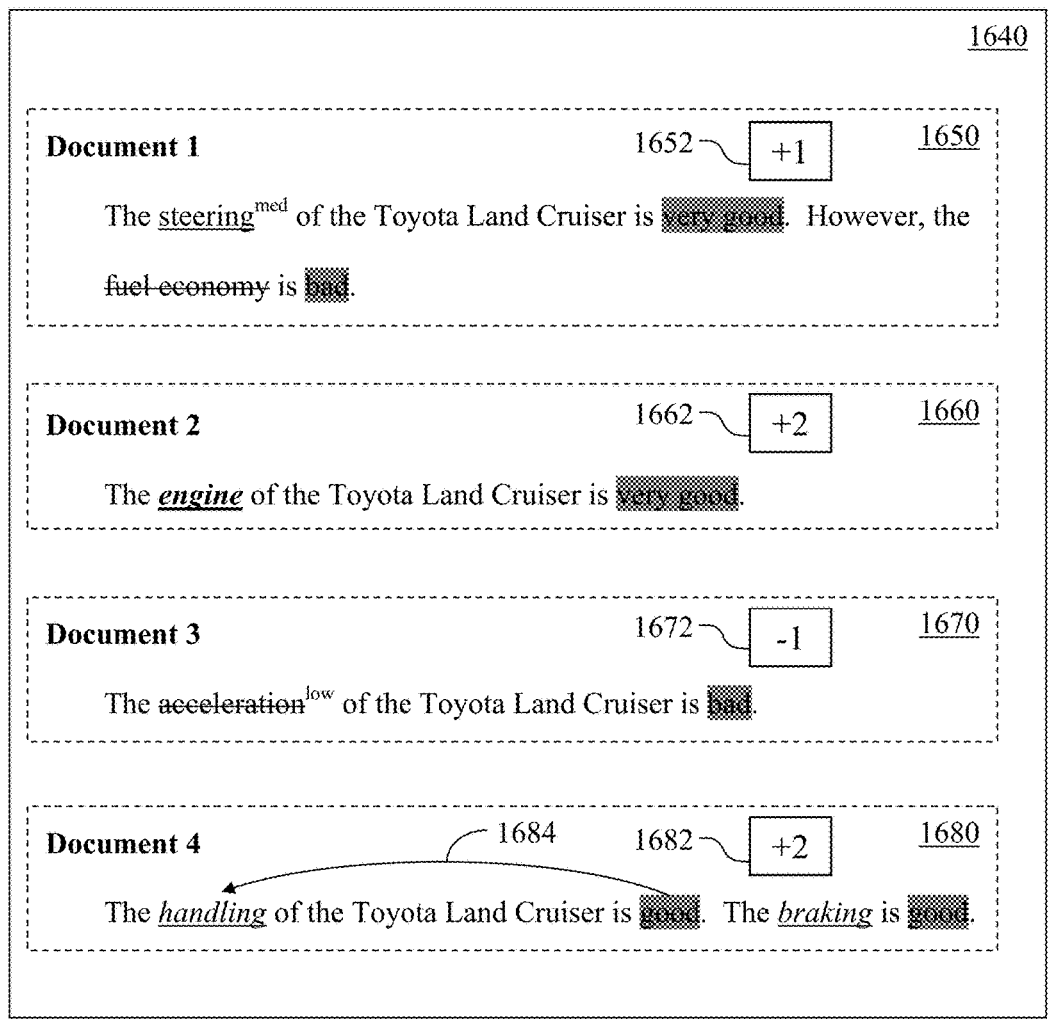
FIG. 16B shows an exemplary on-screen graphical user interface for displaying at least one search result in accordance with one embodiment of the present invention.

As shown in FIG. 16, region 1620 may include at least one search result and/or data associated therewith. For example, region 1620 may include at least one respective identifier associated with each search result. As another example, region 1620 may include at least one respective snippet or portion of text associated with each search result. As yet another example, region 1620 may include at least one respective portion of sentiment data (e.g., at least one score, at least one category, at least one degree, at least one classification, some combination thereof, etc.) associated with each search result. And in one embodiment, region 1620 may be implemented by at least one GUI (e.g., 1600B of FIG. 16B, another GUI, etc.).

FIG. 16B shows exemplary on-screen graphical user interface (GUI) 1600B for displaying at least one search result in accordance with one embodiment of the present invention. In one embodiment, GUI 1600B may be used to implement or be displayed in region 1630 of GUI 1600A of FIG. 16A. And in one embodiment, GUI 1600B may be used to implement or be displayed as at least a portion of a webpage.

As shown in FIG. 16B, GUI 1600 may include at least one respective region (e.g., 1650, 1660, 1670, 1680, etc.) for displaying information associated with each search result of at least one search result. The information may include at least one respective identifier associated with each search result (e.g., "Document 1," "Document 2," "Document 3," "Document 4," etc.), at least one respective snippet or portion of text associated with each search result (e.g., "The steering of the Toyota Land Cruiser is very good," "However, the fuel economy is bad," "The engine of the Toyota Land Cruiser is very good," etc.), some combination thereof, etc. Display of the snippets or portions of text of the search results or documents may function as a preview of a search result or document (e.g., allowing a user to view a portion of a document without having to access or download the entire document).

GUI 1600B may also include an image or information associated with sentiment data (e.g., associated with a particular search result, associated with a plurality of search results, etc.). In one embodiment, a respective image may be displayed as a respective background of at least one region of GUI 1600B (e.g., within region 1650, within region 1660, within region 1670, within region 1680, etc.), where the respective images may be associated with respective sentiment data of each search result. For example, a green image may be displayed as the background of region 1650 to indicate a positive sentiment score (e.g., a combined sentiment score determined based on respective sentiment scores associated with a plurality of affected portions, a single sentiment score where at least one document only includes a single respective affected portion, etc.) of "+1" associated with "Document 1," a red image may be displayed as the background of region 1670 to indicate a negative sentiment score (e.g., a combined sentiment score determined based on respective sentiment scores associated with a plurality of affected portions, a single sentiment score where at least one document only includes a single respective affected portion, etc.) of "−1" associated with "Document 3," a white image may be displayed as the background of region 1650 to indicate a neutral sentiment score (e.g., a combined sentiment score determined based on respective sentiment scores associated with a plurality of affected portions, a single sentiment score where at least one document only includes a single respective affected portion, etc.), etc. The image may be a solid color or shade of gray, a color or shade of gray that is at least partially translucent (e.g., to all the contemporaneous viewing of overlapping text or other images), a pattern, a pixilated image include a plurality of pixels, some combination thereof, etc. In this manner, GUI 1600B may communicate and/or provide a relatively large amount of data in a comprehensible and intuitive manner, thereby allowing the respective sentiment of each search result to be quickly and easily determined and/or identified by a viewer or user of GUI 1600B in one embodiment.

Each image displayed in each region (e.g., 1650, 1660, 1670, 1680, etc.) may be determined based on at least one score and/or at least one category associated with each search result (e.g., from one or more columns of data structure 500). For example, an image associated with a positive sentiment may be displayed if: a positive score (e.g., in column 520) is larger than at least one other score (e.g., in column 530, in column 540, etc.) for a given search result or document; and/or a net score (e.g., in column 550) is positive. As another example, an image associated with a negative sentiment may be displayed if: a negative score (e.g., in column 530) is larger than at least one other score (e.g., in column 520, in column 540, etc.) for a given search result or document; and/or a net score (e.g., in column 550) is negative. As a further example, an image associated with a neutral sentiment may be displayed if: a neutral score (e.g., in column 540) is larger than at least one other score (e.g., in column 520, in column 530, etc.) for a given search result or document; and/or a net score (e.g., in column 550) is neutral (e.g., zero, within a predetermined positive range from zero, within a predetermined negative range from zero, etc.).

Each image displayed in each region (e.g., 1650, 1660, 1670, 1680, etc.) may be determined based on at least one score and/or at least one degree associated with each search result (e.g., from one or more columns of data structure 500). For example, an image associated with a low degree may be displayed if the absolute value of a score (e.g., in one or more columns of data structure 500) is below a predetermined threshold. As another example, an image associated with a medium degree may be displayed if the absolute value of a score (e.g., in one or more columns of data structure 500) is below a first predetermined threshold and/or above a second predetermined threshold. As a further example, an image associated with a high degree may be displayed if the absolute value of a score (e.g., in one or more columns of data structure 500) is above a predetermined threshold.

Each image displayed in each region (e.g., 1650, 1660, 1670, 1680, etc.) may be determined based on at least one classification associated with each search result (e.g., from column 1040 of data structure 1000). For example, a first image associated with a first classification may be displayed for any search results associated with the first classification, a second image associated with a second classification may be displayed for any search results associated with the second classification, etc.

In one embodiment, an image associated with sentiment data may be displayed as a background of GUI 1600B (e.g., within region 1640), where the image may be associated with sentiment data of a plurality of search results (e.g., associated with region 1650, region 1660, region 1670, region 1680, etc.). For example, a green image may be displayed as the background of region 1640 to indicate a positive sentiment score (e.g., a combined sentiment score determined based on respective sentiment scores associated with each of the search results) of the search results (e.g., where the respective sentiment scores add to make a positive sentiment score for the search results), a red image may be displayed as the background of region 1640 to indicate a negative sentiment score (e.g., a combined sentiment score determined based on respective sentiment scores associated with each of the search results) of the search results (e.g., where the respective sentiment scores add to make a negative sentiment score for the search results), a white image may be displayed as the background of region 1640 to indicate a neutral sentiment score (e.g., a combined sentiment score determined based on respective sentiment scores associated with each of the search results) of the search results (e.g., where the respective sentiment scores add to make a sentiment score of zero for the search results, a score of within a predetermined range for the search results, etc.), etc. The image may be a solid color or shade of gray, a color or shade of gray that is at least partially translucent (e.g., to all the contemporaneous viewing of overlapping text or other images), a pattern, a pixilated image include a plurality of pixels, some combination thereof, etc. In this manner, GUI 1600B may communicate and/or provide a relatively large amount of data in a comprehensible and intuitive manner, thereby allowing the respective sentiment of each search result to be quickly and easily determined and/or identified by a viewer or user of GUI 1600B in one embodiment.

Each image displayed in region 1640 may be determined based on at least one score and/or at least one category associated with the search results (e.g., from one or more columns of data structure 500). For example, an image associated with a positive sentiment may be displayed if: a sum of the positive scores for the search results or documents (e.g., in column 520) is larger than at least one other score (e.g., in column 530, in column 540, etc.) for the search results or documents; and/or a sum of the net scores for the search results or documents (e.g., in column 550) is positive. As another example, an image associated with a negative sentiment may be displayed if: a sum of the negative scores for the search results or documents (e.g., in column 530) is larger than at least one other score (e.g., in column 520, in column 540, etc.) for the search results or documents; and/or a sum of the net scores for the search results or documents (e.g., in column 550) is negative. As a further example, an image associated with a neutral sentiment may be displayed if: a sum of the neutral scores for the search results or documents (e.g., in column 540) is larger than at least one other score (e.g., in column 520, in column 530, etc.) for the search results or documents; and/or a sum of the net scores for the search results or documents (e.g., in column 550) is neutral (e.g., zero, within a predetermined positive range from zero, within a predetermined negative range from zero, etc.).

Each image displayed in region 1640 may be determined based on at least one score and/or at least one degree associated with each search result (e.g., from one or more columns of data structure 500). For example, an image associated with a low degree may be displayed if the absolute value of a sum of the scores for the search results or documents (e.g., in one or more columns of data structure 500) is below a predetermined threshold. As another example, an image associated with a medium degree may be displayed if the absolute value of a sum of the scores for the search results or documents (e.g., in one or more columns of data structure 500) is below a first predetermined threshold and/or above a second predetermined threshold. As a further example, an image associated with a high degree may be displayed if the absolute value of a sum of the scores for the search results or documents (e.g., in one or more columns of data structure 500) is above a predetermined threshold.

Each image displayed in region 1640 may be determined based on at least one classification associated with the search results or documents (e.g., from column 1040 of data structure 1000). For example, a first image associated with a first classification may be displayed if any search results are associated with the first classification, a second image associated with a second classification may be displayed if any search results are associated with the second classification, etc.

In one embodiment, an image associated with sentiment data may include at least one icon (e.g., 1652 of FIG. 16B, 1662 of FIG. 16B, 1672 of FIG. 16B, 1682 of FIG. 16B, 1684 of FIG. 16B, etc.) associated with at least one search result. For example, icon 1652 may be displayed (e.g., in or around region 1650) to indicate a sentiment (e.g., a score, a category, a degree, a classification, some combination thereof, etc.) associated with a first search result or document (e.g., "Document 1"), icon 1662 may be displayed (e.g., in or around region 1660) to indicate a sentiment (e.g., a score, a category, a degree, a classification, some combination thereof, etc.) associated with a second search result or document (e.g., "Document 2"), icon 1672 may be displayed (e.g., in or around region 1670) to indicate a sentiment (e.g., a score, a category, a degree, a classification, some combination thereof, etc.) associated with a third search result or document (e.g., "Document 3"), icon 1682 may be displayed (e.g., in or around region 1680) to indicate a sentiment (e.g., a score, a category, a degree, a classification, some combination thereof, etc.) associated with a fourth search result or document (e.g., "Document 4"), etc. Although numbers are shown in each of the regions (e.g., 1652, 1662, 1672, 1682, etc.) in FIG. 16B, it should be appreciated that other icons (e.g., thumbs up, thumbs down, a particular number of stars, etc.) may be displayed or used in other embodiments.

As another example, other icons or images may be displayed to indicate other features related to sentiment. For example, arrow 1684 may be displayed to indicate that the word "good" is an effecting portion that modifies or expresses a sentiment of the word "handling" (e.g., the affected portion). It should be appreciated that effecting portions can modify affected portions in other sentences, paragraphs, etc., and therefore, icons or images such as arrow 1684 may assist the viewer or user in quickly and easily determining the types and relationships of different portions of one or more documents.

In one embodiment, an image associated with sentiment data may include formatting of text associated with at least one search result. The formatting may include highlighting (e.g., displaying the text contemporaneously with an overlapping image that is a different color, shade, etc. than the background of the encompassing region and/or the text), bolding, underlining, italicizing, making larger, making smaller, superscripting, subscripting, changing the color of, capitalization, alternatively formatting, some combination thereof, etc.

The formatted text may include at least one effecting portion (e.g., "very good" and "bad" of "Document 1," "very good" of "Document 2," "bad" of "Document 3," "good" of "Document 4," etc.) and/or at least one affected portion (e.g., "steering" and "fuel economy" of "Document 1," "engine" of "Document 2," "acceleration" of "Document 3," "handling" and "braking" of "Document 4," etc.). In this case, each effecting portion is shown with highlighting, whereas each affected portion is shown with other formatting (e.g., underlining, bolding, italicizing, strikethrough, etc.). As such, a viewer or user may quickly determine which portions of the search results or documents are effecting portions and affected portions. Additionally, display of the image (e.g., including the formatted text) may allow additional information (e.g., a sentiment score, a sentiment category, a sentiment degree, a sentiment classification, etc.) to be quickly and intuitively deduced (e.g., without displaying the additional information), where the additional information may be deduced based on the content of the effecting portions and/or the affected portions, based on the context of the effecting portions and/or the affected portions in the search results or documents, etc.

In one embodiment, different portions of text may be formatted differently to indicate different sentiment scores, different sentiment categories, different sentiment degrees, different sentiment classifications, etc. For example, affected portions associated with a positive sentiment may be formatted or displayed using green text, affected portions associated with a negative sentiment may be formatted or displayed using red text, affected portions associated with a neutral sentiment may be formatted or displayed using white text, etc. As another example, affected portions associated with a positive sentiment may be underlined (e.g., "steering" of "Document 1," "engine" of "Document 2," "handling" and "braking" of Document 4, etc.), whereas affected portions associated with a negative sentiment may be formatted with a strikethrough (e.g., "fuel economy" of "Document 1," "acceleration" of "Document 3," etc.).

As a further example, affected portions associated with a low degree of sentiment may be italicized (e.g., "handling"

and "braking" of "Document 4," etc.), whereas affected portions associated with a medium degree of sentiment may be italicized and bolded (e.g., "engine" of "Document 2," etc.). And as yet another example, a label associated with a low degree of sentiment (e.g., "low," etc.) may be displayed adjacent to or near affected portions associated with a low degree of sentiment (e.g., "acceleration" of "Document 3," etc.), whereas a label associated with a medium degree of sentiment (e.g., "med," etc.) may be displayed adjacent to or near affected portions associated with a medium degree of sentiment (e.g., "steering" of "Document 1," etc.).

Figure 16C:
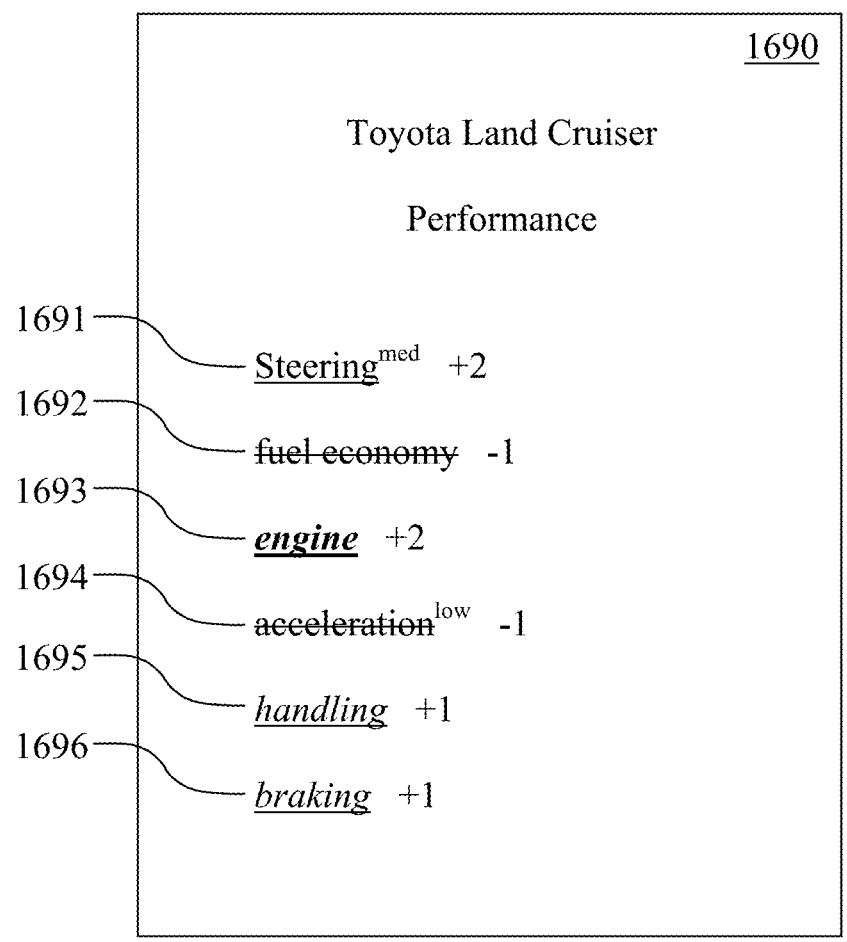
FIG. 16C shows an exemplary on-screen graphical user interface for displaying sentiment data associated with at least one search result in accordance with one embodiment of the present invention.

FIG. 16C shows exemplary on-screen graphical user interface (GUI) 1600C for displaying sentiment data associated with at least one search result in accordance with one embodiment of the present invention. In one embodiment, GUI 1600C may be used to implement or be displayed in region 1620 of GUI 1600A of FIG. 16A. And in one embodiment, GUI 1600C may be used to implement or be displayed as at least a portion of a webpage.

As shown in FIG. 16C, GUI 1600C may include at least one element (e.g., 1691, 1692, 1693, 1694, 1695, 1696, 1697, etc.) in region 1690. Each element may be associated with a respected affected portion (e.g., associated with one or more of the search results or documents of GUI 1600B) in one embodiment. Additionally, each element may include a respective image associated with respective sentiment data (e.g., a score, a category, a degree, a classification, etc.) corresponding to a respective affected portion, where the respective images may include backgrounds behind text associated with the affected portions, icons associated with the affected portions, formatting (e.g., highlighting, bolding, underlining, italicizing, making larger, making smaller, superscripting, subscripting, changing the color of, capitalization, alternatively formatting, etc.) of text associated with the affected portions, some combination thereof, etc.

Accordingly, GUI 1600C may provide information about respective sentiments of respective affected portions of the search results. In one embodiment, the sentiment data presented using GUI 1600C may be determined using sentiment data from multiple search results or documents (e.g., by adding, averaging, etc. the respective sentiment data of each search result or document to determine the combined sentiment data). Moreover, this information may be conveyed in a compact and intuitive form using GUI 1600C.

In one embodiment, one or more of the elements (e.g., 1691, 1692, 1693, 1694, 1695, 1696, 1697, etc.) of GUI 1600C may be associated with other data (e.g., at least one theme, at least one theme element, at least one semantic key, at least one semantic sub-key, etc.) associated with at least one affected portion of a document. In one embodiment, the other data may be determined or accessed (e.g., in accordance with step 1120 of process 1100) based on one or more portions of a query (e.g., where the first data accessed in step 1110 of process 1100 includes at least one portion of a query such as query 1350), where the one or more portions of the query do not include the other data.

For example, data associated with a search (e.g., 1310) may include: a query (e.g., 1350) of "Toyota Land Cruiser" and "performance;" and the command of "sentiment" (e.g., associated with or requesting any category of sentiment such as positive, negative, neutral, some combination thereof, etc.) modifying or associated with the query portion "performance." A search may be performed (e.g., in accordance with step 1220 of process 1200) to generate search results (e.g., accessed in accordance with step 1230 of process 1200) including one or more documents that include: the words or phrases "Toyota Land Cruiser" and "performance;" and at least one affected portion (e.g., associated with any category of sentiment as selected or indicated based on the command "sentiment") including the word "performance" or other data associated therewith (e.g., at least one theme associated with "performance," at least one theme element associated with "performance," at least one semantic key associated with "performance," at least one semantic sub-key associated with "performance," some combination thereof, etc.). In one embodiment, the other data associated with the word "performance" may include the words "steering," "fuel economy," "engine," "acceleration," "handling," "braking," etc.

Sentiment data associated with the word performance or the other data associated therewith (e.g., the words "steering," "fuel economy," "engine," "acceleration," "handling," "braking," etc.) may be accessed (e.g., in accordance with step 1240). For example, sentiment data associated with the word "steering" may include a score of "+2" (e.g., based on the effecting portion "very good" as shown in FIG. 16B), sentiment data associated with the word "fuel economy" may include a score of "−1" (e.g., based on the effecting portion "bad" as shown in FIG. 16B), sentiment data associated with the word "engine" may include a score of "+2" (e.g., based on the effecting portion "very good" as shown in FIG. 16B), sentiment data associated with the word "acceleration" may include a score of "−1" (e.g., based on the effecting portion "bad" as shown in FIG. 16B), sentiment data associated with the word "handling" may include a score of "+1" (e.g., based on the effecting portion "good" as shown in FIG. 16B), sentiment data associated with the word "braking" may include a score of "+1" (e.g., based on the effecting portion "good" as shown in FIG. 16B), etc. Data for displaying an image associated with the sentiment data (e.g., associated with the word "performance" or other data associated therewith) may be generated (e.g., in accordance with step 1250 of process 1200) and/or the image may be displayed (e.g., in accordance with step 1250 of process 1200) to produce a GUI (e.g., 1600C of FIG. 16C) that includes the sentiment data (e.g., respective sentiment data associated with each of the elements 1691, 1692, 1693, 1694, 1695, 1696, 1697, etc.).

Accordingly, in one embodiment, a GUI (e.g., 1600C) may be generated and/or displayed that advantageously includes sentiment data associated with other data (e.g., the words "steering," "fuel economy," "engine," "acceleration," "handling," "braking," etc.) that is not part of the query (e.g., which includes the word "performance" but does not include the words "steering," "fuel economy," "engine," "acceleration," "handling" or "braking"). As such, a user entering the query need not know the other data associated with the word performance or spend the time and effort to enter those words in as part of the query. Instead, embodiments may automatically determine those words (e.g., as one or more themes, one or more theme elements, one or more semantic keys, one or more semantic sub-keys, etc.) based on the simpler and more concise query of "Toyota Land Cruiser" and "performance," where those words (e.g., the "other data") may then be used to generate and/or display the GUI (or perform at least one operation associated with the search results such as filtering, ranking, etc.). Thus, the GUI may provide valuable and relevant information by displaying the sentiment (e.g., associated with sentiment data) of one or more features (e.g., "steering," "fuel economy," "engine," "acceleration," "handling," "braking," etc.) of the Toyota Land Cruiser as determined from at least one search result or document. Further, the sentiment data (e.g., of GUI 1600C) may be displayed contemporaneously with the corresponding search results (e.g., of GUI 1600B) as an image or GUI (e.g., 1600A) in one embodiment, thereby providing even more valuable and relevant information related to the initial query (e.g., which may be displayed in region 1610 of GUI 1600A).

In one embodiment, the data of the previous example may be entered (e.g., by a user, automatically, etc.) using a GUI (e.g., 1400A of FIG. 14A, 1400B of FIG. 14B, 1500 of FIG. 15, etc.). For example, "Toyota Land Cruiser" may be entered in region 1411, "performance" may be entered in region 1431, and the command may be entered using region 1431 (e.g., by entering "sentiment: performance," etc.) and/or using region 1432. As another example, "Toyota Land Cruiser" may be entered in region 1431, "performance" may be entered in region 1411, and the command may be entered using region 1411 (e.g., by entering "sentiment: performance," etc.) and/or using region 1412.

In one embodiment, the other data may not be found in the search results or documents (e.g., of GUI 1600B). In this case, another portion of data may be determined this can be found in the search results or documents and also that is associated with sentiment data. For example, where the word "engine" is not found in at least one document, the word "motor" may be determined (e.g., to be a theme where "engine" is a theme element, to be a theme element where "engine" is a theme, to be a semantic key where "engine" is a semantic sub-key, to be a semantic sub-key where "engine" is a semantic key, etc.). Sentiment data associated with "motor" may be applied to "engine," thereby allowing sentiment data to be displayed (e.g., using GUI 1600C) for "engine" even though "engine" may not be found in at least one document.

Although FIGS. 16A, 16B and 16C show GUIs (e.g., 1600A, 1600B and 1600C, respectively) with a specific number and arrangement of elements, it should be appreciated that the GUIs (e.g., 1600A, 1600B and 1600C) may include a different number and arrangement of elements in other embodiments. For example, GUI 1600A may include more or less than three regions (e.g., 1610, 1620, 1630, etc.) in other embodiments. As another example, GUI 1600B may include more or less than four regions (e.g., 1650, 1660, 1670 and 1680) in other embodiments. And as yet another example, elements of GUI 1600B and/or GUI 1600C may have a different appearance, content, etc. in other embodiments.

In one embodiment, a user could be charged based on the number of searches carried out for which sentiment data is accessed. A user could be charged based on the number of results returned as a result of the search (e.g., performed in step 1220 of process 1200) in one embodiment. A user could be charged based on the number of search results or documents associated with the sentiment data (e.g., accessed in step 1240) in one embodiment. And in one embodiment, a user could be charged based on a number of accesses to sentiment data (e.g., in step 1240 of process 1200) and/or an amount of sentiment data accessed (e.g., in step 1240 of process 1200). Accordingly, one or more features of the sentiment analysis (e.g., as discussed or shown with respect to GUI 1400A, GUI 1400B, GUI 1500, GUI 1600A, GUI 1600B, GUI 1600C, etc.) may be enabled or offered to certain users responsive to payment in one embodiment.

In one embodiment, the sentiment data (e.g., accessed in step 1240, shown in GUI 1600B, etc.) may be used to determine or select advertising content. The advertising content may be displayed (e.g., using GUI 1600A, GUI 1600B, GUI 1600C, etc.) contemporaneously with the search results and/or the sentiment data associated with the search results in one embodiment. For example, where the search term or query is "Nikon D7000" and the sentiment data associated with the search results is positive, then advertising content for the Nikon D7000 camera may be displayed contemporaneously with the search results and/or the sentiment data associated with the search results. As another example, where the search term or query is "Nikon D7000" and the sentiment data associated with the search results is negative, then advertising content for another brand or model of camera may be displayed contemporaneously with the search results and/or the sentiment data associated with the search results. In this manner, relevant advertising content may be provided or displayed at a time where a consumer is more likely to purchase a product or service (e.g., responsive to the display of positive sentiment data related to the product or service of the query, responsive to the display of negative sentiment data related to another product or service of the query, etc.).

Computer System Platform

Figure 17:
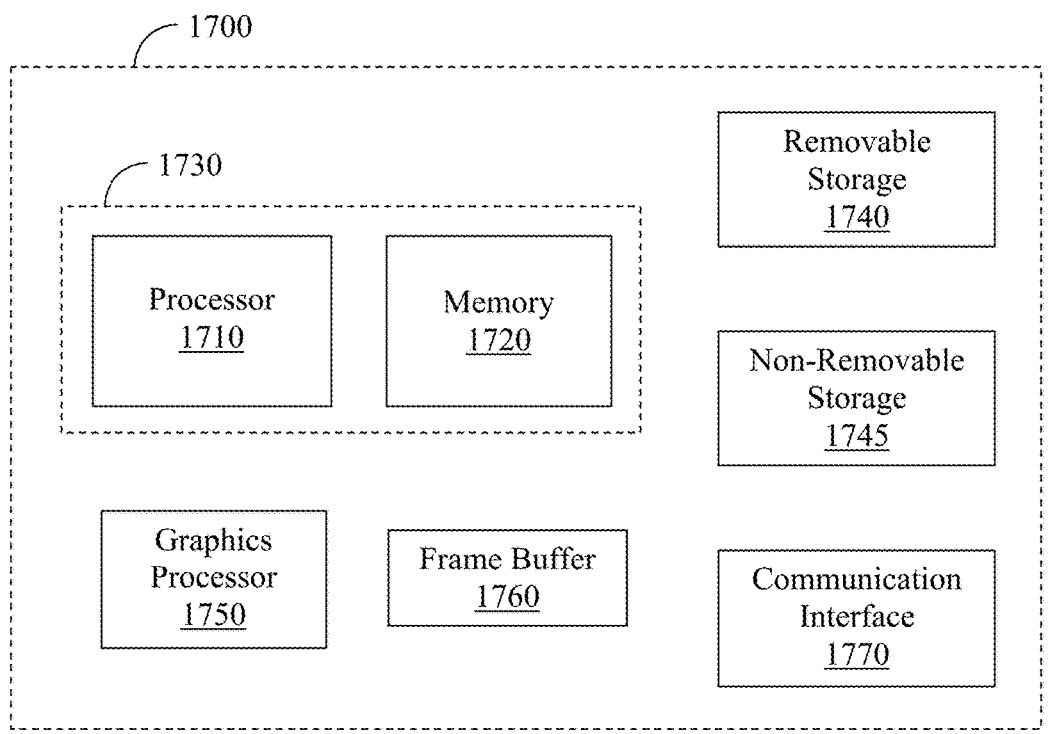
FIG. 17 shows an exemplary computer system platform upon which embodiments of the present invention may be implemented.

FIG. 17 shows exemplary computer system platform 1700 upon which embodiments of the present invention may be implemented. As shown in FIG. 17, portions of the present invention may be implemented by execution of computer-readable instructions or computer-executable instructions that may reside in components of computer system platform 1700 and which may be used as a part of a general purpose computer network. It is appreciated that computer system platform 1700 of FIG. 17 is merely exemplary. As such, the present invention can operate within a number of different systems including, but not limited to, general-purpose computer systems, embedded computer systems, laptop computer systems, hand-held computer systems, portable computer systems, or stand-alone computer systems.

In one embodiment, computer system platform 1700 may be used to implement system 200 (e.g., as shown in FIG. 2), sentiment analysis component 220 (e.g., as shown in FIG. 3), system 1300A (e.g., as shown in FIG. 13A), system 1300B (e.g., as shown in FIG. 13B), some combination thereof, etc. And in one embodiment, one or more components of computer system platform 1700 may be disposed in and/or coupled with a housing or enclosure.

In one embodiment, depicted by dashed lines 1730, computer system platform 1700 may include at least one processor 1710 and at least one memory 1720. Processor 1710 may include a central processing unit (CPU) or other type of processor. Depending on the configuration and/or type of computer system environment, memory 1720 may include volatile memory (e.g., RAM), non-volatile memory (e.g., ROM, flash memory, etc.), or some combination of the two. Additionally, memory 1720 may be removable, non-removable, etc.

In other embodiments, computer system platform 1700 may include additional storage (e.g., removable storage 1740, non-removable storage 1745, etc.). Removable storage 1740 and/or non-removable storage 1745 may include volatile memory, non-volatile memory, or any combination thereof. Additionally, removable storage 1740 and/or non-removable storage 1745 may include CD-ROM, digital versatile disks (DVD) or other optical storage, magnetic cassettes, magnetic tape, magnetic disk storage or other magnetic storage devices, or any other medium which can be used to store information for access by computer system platform 1700.

As shown in FIG. 17, computer system platform 1700 may communicate with other systems, components, or devices via communication interface 1770. Communication interface 1770 may embody computer-readable instructions, data structures, program modules or other data in a modulated data signal (e.g., a carrier wave) or other transport mechanism. By way of example, and not limitation, communication interface 1770 may couple to wired media (e.g., a wired network, direct-wired connection, etc.) and/or wireless media (e.g., a wireless network, a wireless connection utilizing acoustic, radio frequency (RF), infrared, or other wireless signaling, etc.).

Communication interface 1770 may also couple computer system platform 1700 to one or more input devices (e.g., a keyboard, mouse, pen, voice input device, touch input device or touch screen, etc.). In one embodiment, communication interface 1770 may couple computer system platform 1700 to one or more output devices (e.g., a display, speaker, printer, etc.).

As shown in FIG. 17, graphics processor 1750 may perform graphics processing operations on graphical data stored in frame buffer 1760 or another memory (e.g., 1720, 1740, 1745, etc.) of computer system platform 1700. Graphical data stored in frame buffer 1760 may be accessed, processed, and/or modified by components (e.g., graphics processor 1750, processor 1710, etc.) of computer system platform 1700 and/or components of other systems/devices. Additionally, the graphical data may be accessed (e.g., by graphics processor 1750) and displayed on an output device coupled to computer system platform 1700. Accordingly, memory 1720, removable storage 1740, non-removable storage 1745, frame buffer 1760, or a combination thereof, may be a computer-readable medium or computer-usable medium and may include instructions that when executed by a processor (e.g., 1710, 1750, etc.) implement a method of automatically generating sentiment data (e.g., in accordance with process 100 of FIGS. 1A, 1B and 1C), a method of processing data (e.g., in accordance with process 1100 of FIG. 11), a method of performing at least one operation (e.g., in accordance with process 1200 of FIG. 12), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of automatically generating sentiment data, said method comprising:
 configuring a database to store said sentiment data and location data of said sentiment data, wherein said location data comprises a document identification, a sentence number identification with respect to said document identification, and a word number identification with respect to sentence number identification;
 processing at least one document by using a grammatical analyzer to identify a plurality of portions and said sentiment data related to said portions regardless of portion position with respect to a sentence, a sentence fragment, a paragraph, and a proximity between said portions, wherein said processing includes:
  ignoring a sentence type that represents a question in said at least one document;
  determining respective part of speech for said plurality of portions; and
  identifying selective ones of said portions that modify others of said portions, wherein said identifying includes:
   determining a first portion of said at least one document represents a first sentiment that refers to a second portion of said at least one document;
    automatically determining, based on at least one attribute of said first portion, a first score for said first sentiment that refers to said second portion;
    determining a third portion of said at least one document represents a second sentiment that refers to a fourth portion of said at least one document; and
    automatically determining, based on at least one attribute of said third portion, a second score for said second sentiment that refers to said fourth portion;
 storing said sentiment data comprising said first, second, third, and fourth portions, said first and second scores, and said at least one attributes in said database and storing said location data further comprising first location data of said first and second portions and second location data of said third and fourth portions in said database;
 in response to a search result, modifying said search result by using said sentiment data to alter a visual rendering on a display of original text format and original display color of said search result and to insert visual indicators of said sentiment data in said visual rendering on said display;
 determining that said second portion and said fourth portion are semantic sub-keys associated with a semantic key;
 determining a third score associated with said semantic key by adding said first and second scores;
 storing said semantic key and said third score in said database;
 determining a first classification associated with said first portion;
 determining a second classification associated with said third portion; and
 storing said first and second classifications in said database, and
 wherein said first and second classifications are each selected from a group consisting of an action taker, an action receiver, a description, and an identity.

2. The method of claim 1, wherein said at least one attribute of said first portion and said at least one attribute of said third portion each comprise a respective category selected from a group consisting of positive, negative and neutral.

3. The method of claim 1 further comprising:
 determining that said second portion and said fourth portion are associated with a phrase;
 determining a third score associated with said phrase by adding said first and second scores; and
 storing said phrase and said third score in said database.

4. The method of claim 1 further comprising:
 determining that said second portion and said fourth portion are theme elements associated with a theme;
 determining a third score associated with said theme by adding said first and second scores; and
 storing said theme and said third score in said database.

5. A non-transitory computer-readable medium having computer-readable program code embodied therein for causing a computer system to perform a method of automatically generating sentiment data, said method comprising:
configuring a database to store said sentiment data and location data of said sentiment data, wherein said location data comprises a document identification, a sentence number identification with respect to said document identification, and a word number identification with respect to said sentence number identification;
processing at least one document by using a grammatical analyzer to identify a plurality of portions and said sentiment data related to said portions regardless of portion position with respect to a sentence, a sentence fragment, a paragraph, and a proximity between said portions, wherein said processing includes:
ignoring a sentence type that represents a question in said at least one document;
determining respective part of speech for said plurality of portions; and
identifying selective ones of said portions that modify others of said portions, wherein said identifying includes:
determining a first portion of said at least one document represents a first sentiment that refers to a second portion of said at least one document;
automatically determining, based on at least one attribute of said first portion, a first score for said first sentiment that refers to said second portion;
determining a third portion of said at least one document represents a second sentiment that refers to a fourth portion of said at least one document; and
automatically determining, based on at least one attribute of said third portion, a second score for said second sentiment that refers to said fourth portion;
storing said sentiment data comprising said first, second, third, and fourth portions, said first and second scores, and said at least one attributes in said database and storing said location data further comprising first location data of said first and second portions and second location data of said third and fourth portions in said database;
in response to a search result, modifying said search result by using said sentiment data to alter a visual rendering on a display of original text format and original display color of said search result and to insert visual indicators of said sentiment data in said visual rendering on said display;
determining that said second portion and said fourth portion are semantic sub-keys associated with a semantic key;
determining a third score associated with said semantic key by adding said first and second scores;
storing said semantic key and said third score in said database;
determining a first classification associated with said first portion;
determining a second classification associated with said third portion; and
storing said first and second classifications in said database, and
wherein said first and second classifications are each selected from a group consisting of an action taker, an action receiver, a description, and an identity.

6. The non-transitory computer-readable medium of claim 5, wherein said at least one attribute of said first portion and said at least one attribute of said third portion each comprise a respective category selected from a group consisting of positive, negative and neutral.

7. The non-transitory computer-readable medium of claim 5, wherein said method further comprises:
determining that said second portion and said fourth portion are associated with a phrase;
determining a third score associated with said phrase by adding said first and second scores; and
storing said phrase and said third score in said database.

8. The non-transitory computer-readable medium of claim 5, wherein said method further comprises:
determining that said second portion and said fourth portion are theme elements associated with a theme;
determining a third score associated with said theme by adding said first and second scores; and
storing said theme and said third score in said database.

9. A system comprising a processor and a memory, wherein said memory comprises instructions that when executed by said processor implement a method of automatically generating sentiment data, said method comprising:
configuring a database to store said sentiment data and location data of said sentiment data, wherein said location data comprises a document identification, a sentence number identification with respect to said document identification, and a word number identification with respect to said sentence number identification;
processing at least one document by using a grammatical analyzer to identify a plurality of portions and said sentiment data related to said portions regardless of portion position with respect to a sentence, a sentence fragment, a paragraph, and a proximity between said portions, wherein said processing includes:
ignoring a sentence type that represents a question in said at least one document;
determining respective part of speech for said plurality of portions; and
identifying selective ones of said portions that modify others of said portions, wherein said identifying includes:
determining a first portion of said at least one document represents a first sentiment that refers to a second portion of said at least one document;
automatically determining, based on at least one attribute of said first portion, a first score for said first sentiment that refers to said second portion;
determining a third portion of said at least one document represents a second sentiment that refers to a fourth portion of said at least one document; and
automatically determining, based on at least one attribute of said third portion, a second score for said second sentiment that refers to said fourth portion;
storing said sentiment data comprising said first, second, third, and fourth portions, said first and second scores, and said at least one attributes in said database and storing said location data further comprising first location data of said first and second portions and second location data of said third and fourth portions in said database;
in response to a search result, modifying said search result by using said sentiment data to alter a visual rendering on a display of original text format and original display color of said search result and to insert visual indicators of said sentiment data in said visual rendering on said display;

determining that said second portion and said fourth portion are semantic sub-keys associated with a semantic key;

determining a third score associated with said semantic key by adding said first and second scores;

storing said semantic key and said third score in said database;

determining a first classification associated with said first portion;

determining a second classification associated with said third portion; and storing said first and second classifications in said database, and wherein said first and second classifications are each selected from a group consisting of an action taker, an action receiver, a description, and an identity.

10. The system of claim 9, wherein said at least one attribute of said first portion and said at least one attribute of said third portion each comprise a respective category selected from a group consisting of positive, negative and neutral.

11. The system of claim 9, wherein said method further comprises:

determining that said second portion and said fourth portion are associated with a phrase;

determining a third score associated with said phrase by adding said first and second scores; and storing said phrase and said third score in said database.

12. The system of claim 9, wherein said method further comprises:

determining that said second portion and said fourth portion are theme elements associated with a theme;

determining a third score associated with said theme by adding said first and second scores; and storing said theme and said third score in said database.

* * * * *